US008020029B2

(12) United States Patent
Aggarwal et al.

(10) Patent No.: US 8,020,029 B2
(45) Date of Patent: Sep. 13, 2011

(54) METHOD AND APPARATUS FOR RENDERING GAME ASSETS IN DISTRIBUTED SYSTEMS

(75) Inventors: Sudhir Aggarwal, Tallahassee, FL (US);
Hemant Banavar, Redmond, WA (US);
Sarit Mukherjee, Morganville, NJ (US);
Sampath Rangarajan, Bridgewater, NJ (US)

(73) Assignees: Alcatel Lucent, Paris (FR); Florida State University Research Foundation, Tallahassee, FL (US)

( * ) Notice: Subject to any disclaimer, the term of this patent is extended or adjusted under 35 U.S.C. 154(b) by 1358 days.

(21) Appl. No.: 11/539,915

(22) Filed: Oct. 10, 2006

(65) Prior Publication Data

US 2007/0220363 A1 Sep. 20, 2007

Related U.S. Application Data

(60) Provisional application No. 60/774,570, filed on Feb. 17, 2006.

(51) Int. Cl.
*G06F 11/00* (2006.01)
(52) U.S. Cl. ............... 714/2; 463/31; 463/42; 709/205; 709/206; 709/207; 714/45
(58) Field of Classification Search ......... 714/2; 463/42
See application file for complete search history.

(56) References Cited

U.S. PATENT DOCUMENTS

| | | | |
|---|---|---|---|
| 6,845,389 B1* | 1/2005 | Sen et al. .................. 709/204 |
| 2002/0128065 A1* | 9/2002 | Chung et al. .............. 463/42 |
| 2002/0183961 A1* | 12/2002 | French et al. ............. 702/150 |
| 2003/0164084 A1* | 9/2003 | Redmann et al. .......... 84/615 |
| 2003/0177187 A1* | 9/2003 | Levine et al. .............. 709/205 |
| 2004/0006424 A1* | 1/2004 | Joyce et al. ............... 701/207 |
| 2004/0116186 A1* | 6/2004 | Shim et al. ................ 463/42 |
| 2004/0143176 A1* | 7/2004 | Foxlin ....................... 600/395 |
| 2004/0198386 A1* | 10/2004 | Dupray ..................... 455/456.1 |
| 2005/0065725 A1* | 3/2005 | Jeon et al. ................. 701/213 |
| 2005/0094655 A1* | 5/2005 | Newson et al. ........... 370/412 |
| 2005/0265583 A1* | 12/2005 | Covell et al. ............. 382/103 |
| 2007/0087756 A1* | 4/2007 | Hoffberg .................. 455/450 |
| 2007/0155401 A1* | 7/2007 | Ward et al. ............... 455/456.1 |
| 2007/0168188 A1* | 7/2007 | Choi ........................ 704/211 |
| 2008/0005172 A1* | 1/2008 | Gutmann ................. 707/104.1 |

OTHER PUBLICATIONS

Delano et al., "Network Software Architectures for Real-Time Massively-Multiplayer Online Games," Feb. 2, 2005, McGill University.*
S. Aggarwal et al., "Fairness in Dead-Reckoning Based Distributed Multi-Player Games," NetGames '05, Oct. 10-11, 2005, Hawthorne, New York, USA.

* cited by examiner

*Primary Examiner* — Scott T Baderman
*Assistant Examiner* — Chae Ko
(74) *Attorney, Agent, or Firm* — Wall & Tong, LLP

(57) ABSTRACT

The invention includes a method and apparatus for attempting to synchronize delivery of information at a plurality of receiving systems. The method includes generating, at a sending system, a plurality of current messages adapted for rendering an asset within an application space of a respective plurality of receiving systems, determining an accumulated export error for each of the receiving systems, transmitting the current messages toward the respective receiving systems in a manner adapted to reduce the accumulated export errors. The accumulated export error for a receiving system includes an estimated current message export error for a current message generated by the sending system for the receiving system and an accumulated previous message export error for at least one previous message generated by the sending system for the receiving system.

20 Claims, 11 Drawing Sheets

(A)
↓
DETERMINE SURPLUS TRANSMISSION FREQUENCIES FOR RESPECTIVE IDENTIFIED RECEIVING GAME SYSTEMS — 926
↓
UPDATE TRANSMISSION FREQUENCIES FOR RESPECTIVE SUBSET OF RECEIVING GAME SYSTEMS BY DISTRIBUTING SURPLUS TRANSMISSION FREQUENCIES ACROSS RECEIVING GAME SYSTEMS — 928
↓
(C)

(B)
↓
DETERMINE SCHEDULED TRANSMISSION TIMES FOR RESPECTIVE SUBSET OF RECEIVING GAME SYSTEMS USING RESPECTIVE UPDATED TRANSMISSION FREQUENCIES — 930
↓
UPDATE SCHEDULED TRANSMISSION TIMES FOR RESPECTIVE SUBSET OF RECEIVING GAME SYSTEMS USING RESPECTIVE PREVIOUS CREDIT VALUES ASSOCIATED WITH PREVIOUS DEAD-RECKONING VECTOR — 932
↓
UPDATE SCHEDULED TRANSMISSION TIMES FOR RESPECTIVE SUBSET OF RECEIVING GAME SYSTEMS USING CEILING FUNCTION — 934
↓
DETERMINE CURRENT CREDIT VALUES ASSOCIATED WITH CURRENT DEAD-RECKONING VECTOR FOR RESPECTIVE RECEIVING GAME SYSTEMS AS DIFFERENCES BETWEEN SCHEDULED TRANSMISSION TIMES UPDATED USING CEILING FUNCTION AND SCHEDULED TRANSMISSION TIMES UPDATED USING PREVIOUS CREDIT VALUES — 936
↓
(D)

METHOD AND APPARATUS FOR RENDERING GAME ASSETS IN DISTRIBUTED SYSTEMS

CROSS-REFERENCE TO RELATED APPLICATION

This application claims priority of commonly owned U.S. Provisional Patent Application Ser. No. 60/774,570 filed on Feb. 17, 2006, which is incorporated by reference herein in its entirety.

FIELD OF THE INVENTION

The invention relates to the field of communication networks and, more specifically, to distributed multiplayer games.

BACKGROUND OF THE INVENTION

In a distributed multiplayer game, end users are often geographically distributed, with each end user using an associated game system. In such games, end users control players and, optionally, associated entities, within the game space. The players/entities may include any virtual objects existing within the game space. During the course of the game, players/entities move within the game space. The portion of the game space in which each player moves is displayed to the associated end user controlling the player. In most multiplayer games, all players are capable of moving within the game space simultaneously. In order to ensure accurate and fair play, each end user must be able to see a continuously updated position of each player/entity within the portion of the game space occupied by the player controlled by that end user.

Since continuous exchange of information between game systems is almost impossible, a technique known as dead-reckoning is commonly used to exchange player/entity movement information among game systems. Using dead-reckoning, each game system sends player/entity position and movement information (with respect to that player, and entities controlled by that player) to every other game system using dead-reckoning vectors. A dead-reckoning vector includes information about the position and movement of a player/entity within the game space on the system from which the dead-reckoning vector is sent. The exchanged dead-reckoning vectors are processed by systems which receive the dead-reckoning vectors for rendering the player/entity in the game space on the respective systems which receive the dead-reckoning vectors.

In existing game systems (i.e., distributed multiplayer games limited to a small number of players in close proximity), network delay may be assumed to be negligible. Disadvantageously, however, even if network delay is negligible, due to use of dead-reckoning vectors to project player/entity trajectory, by the time a dead-reckoning vector is received and rendered by a receiving game system, the original trajectory of the player/entity at the sending game system may have already changed. As such, in physical time, there is a deviation at the receiving game system between the real trajectory (denoted as a real path) and the rendered trajectory (denoted as the placed path). This deviation is unavoidable unless every movement for a player/entity is continuously sent to every game system.

In emerging games (i.e., distributed multiplayer games involving a large number of players interacting over large distances using the Internet), network delay is not negligible, resulting in a deviation between the placed path and rendering on the receiving game system of the player/entity associated with the dead-reckoning vector exported by the sending game system (denoted as an exported path). The path of a player/entity that a sending game system expects receiving game systems to follow in physical time may not be followed in physical time due to non-negligible network delay. In other words, placed paths and associated exported paths may deviate in physical time, thereby creating game-playing inaccuracies. This deviation between placed paths and associated exported paths may be denoted as an export error.

In distributed multiplayer games, game playing accuracy is measured according to the game playing experience as observed by end users in terms of accurate placement and movement of players/entities on distributed game systems (i.e., maximum game playing accuracy is achieved in the absence of network delay). According to such game playing accuracy, in physical time, end users should experience identical movements of players/entities within the game space. In one embodiment, this notion of game playing accuracy may be defined using the following player/entity trajectories: (1) the trajectory of the player/entity at the receiving game system before the dead-reckoning vector is received and (2) the trajectory of the player/entity at the receiving game system after the dead-reckoning vector is received.

An export error associated with movement of the player/entity at the receiving game system before the dead-reckoning vector is received at the receiving game system is denoted as a before export error. An export error associated with movement of the player/entity at the receiving game system after the dead-reckoning vector is received at the receiving game system is denoted as an after export error. Both before export errors and after export errors are due to a deviation between the exported path on the sending game system and the placed path on the receiving game system (i.e., due to network delay in propagating dead-reckoning vectors from sending game systems to receiving game systems). In existing distributed multiplayer games, receiving game systems experience both before export errors and after export errors, thereby resulting in game-playing inaccuracies.

SUMMARY OF THE INVENTION

Various deficiencies in the prior art are addressed through the invention of a method and apparatus for attempting to synchronize delivery of information at a plurality of receiving systems. The method includes generating, at a sending system, a plurality of current messages adapted for rendering an asset within an application space of a respective plurality of receiving systems, determining an accumulated export error for each of the receiving systems, transmitting the current messages toward the respective receiving systems in a manner adapted to reduce the accumulated export errors. The accumulated export error for a receiving system includes an estimated current message export error for a current message generated by the sending system for the receiving system and an accumulated previous message export error for at least one previous message generated by the sending system for the receiving system. The current messages may be generated in response to a trigger condition which may include one of a dead-reckoning threshold being satisfied or a periodic trigger condition.

In one embodiment, transmitting the current messages includes computing, using the accumulated export errors, a plurality of scheduling times associated with respective receiving systems and transmitting the current messages toward the respective receiving systems according to the respective scheduling times. In one embodiment, transmitting the current messages includes determining, using the accumulated export errors, a plurality of transmission probabilities for the receiving systems and transmitting the current messages toward a portion of the receiving game systems using the transmission probabilities. In one embodiment, transmitting the current messages includes identifying a subset of the receiving systems scheduled to receive the current messages, and transmitting the current messages toward the receiving systems in the subset of receiving systems.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention attempts to reduce accumulated export errors associated with transmission of messages from a sending system to respective receiving systems. The accumulated export error associated with a receiving system includes an estimated export error associated with the current message generated by the sending system for the receiving system (denoted as an estimated current message export error) and an accumulated relative export error associated with at least one previous message generated by the sending system for the receiving system (denoted as an accumulated previous message export error). Although primarily depicted and described herein with respect to information adapted for placing/rendering game assets within game space on receiving system, the present invention may be utilized for reducing errors associated with transmission of various other information from sending systems to receiving systems.

Although primarily depicted and described herein with respect to game players and game entities, game players and game entities may be more generally referred herein to as game assets, or, simply, assets. Although primarily depicted and described herein with respect to a specific topology of the communication network, communication networks used in accordance with the present invention may be implemented using other topologies. Although primarily depicted and described herein with respect to game spaces having specific properties, the present invention may be utilized for exchanging asset information for game spaces having various other combinations of associated properties.

Figure 1:
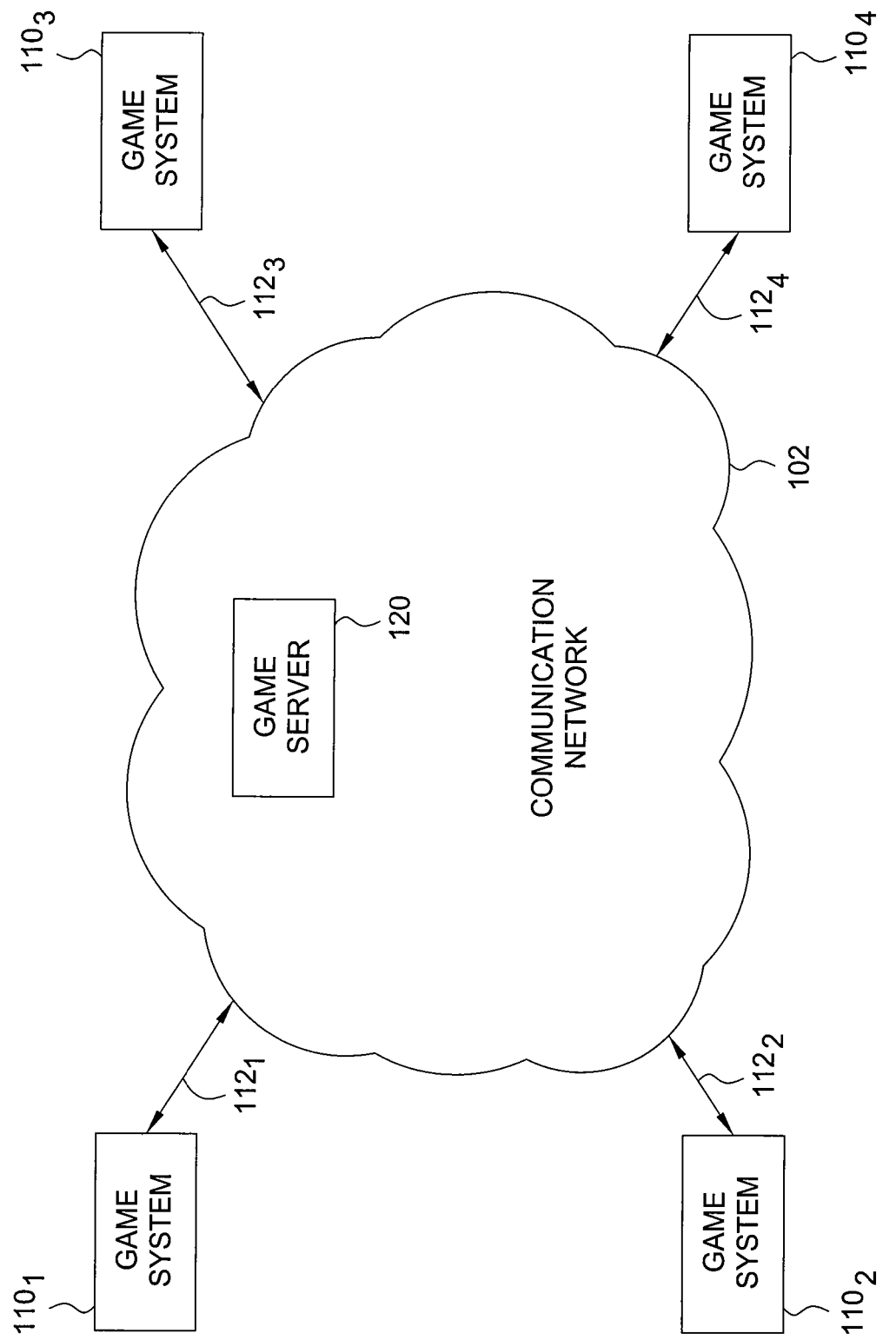
FIG. 1 depicts a high-level block diagram of a communication network supporting communications between distributed game systems.

FIG. 1 depicts a high-level block diagram of a communication network supporting communication between distributed game systems. Specifically, communication network 100 of FIG. 1 includes a network 102 supporting communication between a plurality of game systems $110_1$-$110_4$ (collectively, game systems 110), as well as between game systems 110 and a game server 120. As depicted in FIG. 1, game systems $110_1$-$110_4$ access communication network 102 using a respective plurality of system access links $112_1$-$112_4$ (collectively, system access links 112). As depicted in FIG. 1, game server 120 accesses communication network 102 using a server access link 122. As depicted in FIG. 1, communication network 102 may be implemented using any packet-based communications technology.

As depicted in FIG. 1, communication network 102 includes a game server 120. In one embodiment, game server 120 communicates with game systems 110 for exchanging game information. The game information may include information associated with the operation of the game (e.g., game software updates, news about changes to the game, and the like, as well as various combinations thereof), information adapted for rendering game-controlled players/entities, game timing information (e.g., global time information adapted for use by game systems 110 in synchronizing with a global time reference), and the like, as well as various combinations thereof. The game server 120 may perform various other functions.

As depicted in FIG. 1, game systems 110 include systems operable for supporting distributed multiplayer games. The game systems 110 include processors, memory, and like components for performing various functions. The game systems 110 run game software. The game systems 110 capture information associated with players/entities controlled on the respective game systems 110 (e.g., position and trajectory information adapted for rendering the players/entities within game space on other game systems). The game systems 110 establish/maintain network connectivity for use in exchanging asset placement (rendering) information with other game systems 110. The game systems 110 process asset placement information received from other game systems 110 in order to place, within the game space, players/entities controlled within the game space on the other game systems 110.

The game systems 110 include presentation devices (e.g., monitors, speakers, and the like, as well as various combinations thereof) for presenting game information to associated end users. The game information may be presented within the context of the game space (and the view of the game space may vary across game systems according to the portion of the game space in which the player/entity is operating). The game systems 110 include interaction devices (e.g., joysticks, controllers, keyboards, and the like, as well as various combinations thereof) for enabling end users to interact with the game, as well as with other end users associated with other game systems 110. For example, game systems 110 may include computers, gaming consoles (e.g., SONY PLAYSTATION, NINTENDO N64, and the like), and the like, as well as various combinations thereof.

As depicted in FIG. 1, each game system 110 operates as a sending game system (for locally controlled players/entities) and a receiving game system (for remotely controlled players/entities). A sending game system 110 generates game information for each player/entity controlled locally within the game space on the sending game system 110. The sending game system 110 sends generated game information to receiving game systems 110 (e.g., to every other game system 110). The receiving game systems 110 process received game information for placing the associated player/entity within the game space on that receiving game system 110.

A game space is a virtual environment in which a game is played (i.e., in which graphical characters and associated graphical entities interact). A game space may include a coordinate system (e.g., x-y-z coordinates for three-dimensional game spaces) which may be used to identify positions within the game space (e.g., positions of characters, entities, and the like). The game space may include a global time. The game space, or at least a portion thereof, is displayed to one or more users associated with each game system. As described herein, display of the game space may vary across game systems according to the portion of the game space in which each end user is operating, differences introduced by export errors and other errors, computing capabilities of sending and receiving systems, and the like, as well as various combinations thereof. Although end users may be considered to be operating within a single game space, due to varying states of the game space across different game systems, at each moment in time, each game system may be displaying a slightly different representation or instance of the game space.

The present invention attempts to minimize the differences in representations of the game space displayed on distributed game systems 110. The game systems 110 exchange asset information in an effort to provide distributed end users with an identical view of the progression of the game within the game space (i.e., of the current state of each player/entity within the game space). In one embodiment, game systems 110 exchange asset information to attempt to synchronize, across game systems 110, positions and movements of the assets within game space. In one embodiment, game systems 110 may exchange game information with one or more central game servers (illustratively, game server 120) for centrally controlled game players, entities, and like game assets, as well as various combinations thereof.

In one embodiment, exchanged information includes asset information, such as player/entity position information, player/entity trajectory information, and like information associated with respective players/entities, as well as various combinations thereof. In one embodiment, asset information is exchanged by game systems 110 using a data structure adapted for conveying the asset information. Within the context of gaming systems, asset information is typically exchanged using a data structure known as a dead-reckoning vector. As described herein, a dead-reckoning vector, which is computed and created by a sending game system, includes information adapted for placing, and optionally, moving, a player/entity within the game space on a receiving game system. Although primarily described herein with respect to using dead-reckoning vectors to exchange asset information, other data structures may be used in order to exchange asset information.

In one embodiment, asset information is exchanged by game systems 110 using dead-reckoning vectors. A dead-reckoning vector may include information adapted for rendering a player/entity at a receiving game system (denoted as asset rendering information or asset placement information). In one embodiment, dead-reckoning vectors include player/entity position information, such as a starting position, one or more intermediate positions, and like positions of players/entities within the game space, as well as various combinations thereof. In one embodiment, dead-reckoning vectors include player/entity trajectory information, which may include velocity information, acceleration information, and the like, as well as various combinations thereof. Although primarily described herein with respect to dead-reckoning vectors including position information and trajectory information, dead-reckoning vectors may include various other combinations of information adapted for rendering an associated player/entity at a receiving game system.

In one embodiment, dead-reckoning vectors may include linear dead-reckoning vectors including starting position and constant velocity information adapted for placing an associated player/entity within a game space, and for continuing to render the player/entity in a straight-line path within the game space. In one embodiment, in a two-dimensional gaming space, dead-reckoning vectors may include two-dimensional dead-reckoning vectors (e.g., [x, y, vz, vy]), where x is the starting position along the x axis, y is the starting position along the y axis, vx is the velocity in the direction of the x axis, and vy is the velocity in the direction of the y axis. In one embodiment, in a three-dimensional gaming space, linear dead-reckoning vectors may include three-dimensional dead-reckoning vectors (e.g., [x, y, z, vz, vy, vz]).

Although primarily described herein with respect to linear dead-reckoning vectors including position and trajectory information including velocity information, dead-reckoning vectors may include other information for placing and moving associated players/entities within game space at a receiving game system. Although primarily described herein with respect to linear dead-reckoning vectors having starting position information including positional coordinates and trajectory information including velocity information, various other dead-reckoning vectors may be utilized for placing and moving a player/entity within a game space at a receiving game system, and continuing to move the player/entity within the game space at the receiving game system until the next dead-reckoning vector is received at the receiving game system.

In one embodiment, dead-reckoning vectors exchanged by game systems may include quadriatic dead-reckoning vectors including acceleration information. In one embodiment, dead-reckoning vectors exchanged by game systems may include cubic spline dead-reckoning vectors including starting and ending position information and starting and ending velocity information. For purposes of clarity, the present invention is primarily described herein with respect to linear two-dimensional dead-reckoning vectors and linear three-dimensional dead-reckoning vectors having starting position information and velocity information.

In such embodiments, upon receiving a dead-reckoning vector for a player/entity, receiving game systems place the player/entity within the game space using the dead-reckoning vector. In one such embodiment, for a dead-reckoning vector including starting position information (e.g., x, y coordinates) and trajectory information (e.g., vx, vy, velocities associated with the x, y coordinates, respectively), receiving game systems process starting position information to place the player/entity within the gaming space and process trajectory information for continuing to render the player/entity along a path within the game space. The receiving game systems render the player/entity along the specified trajectory until another dead-reckoning vector is received for the player/entity.

As receiving game systems receive dead-reckoning vectors from sending game systems, receiving game systems render the associated players/entities using the respective dead-reckoning vectors until another dead-reckoning vector is received for the player/entity. In other words, a current dead-reckoning vector is used to predict the position and trajectory of the player/entity until an updated dead-reckoning vector is received. An updated dead-reckoning vector is typically sent in response to a change in the path of the previous dead-reckoning vector (e.g., in terms of distance in the x-y-z plane). An updated dead-reckoning vector may be sent periodically, in response to a determination that the change in the path exceeds a threshold, and the like, as well as various combinations thereof.

Although primarily depicted and described herein with respect to using dead-reckoning vectors to exchange asset placement/rendering information adapted for placing/rendering assets on distributed game systems, various other data structures may be used for exchanging asset placement/rendering information. In other words, embodiments depicted and described herein as being implemented using dead-reckoning vectors may be implemented using any data structures, messages, signaling, and the like adapted for exchanging asset placement/rendering information between game systems, as well as various combinations thereof. Further, it should be noted that a player/entity may be more generally referred to as a game asset, or, asset.

Although primarily depicted and described herein with respect to synchronization of game assets within a game space, the present invention may be used for synchronizing various other application assets within various other application spaces. The game space described herein merely includes one example of an application space, which may more generally include any virtual environment in which any application (gaming or non-gaming) may operate. In other words, the present invention is not intended to be limited to synchronization of game assets in distributed multiplayer games, but, rather, may be applied to various other non-gaming applications requiring synchronization of assets, objects, and other information which may move within an application space across a plurality of distributed systems.

In one embodiment, for each dead-reckoning vector computed by a sending game system for a plurality of receiving game systems, the dead-reckoning vector may be communicated from the sending game system to the receiving game system using a respective plurality of messages. As described herein, for a current dead-reckoning vector computed by a sending game system for a receiving game system, the current dead-reckoning vector may be communicated to the receiving game system using a current message. Similarly, as described herein, for a previous dead-reckoning vector computed by a sending game system for a receiving game system (i.e., any dead-reckoning vector computed by the sending game system prior to computation of the current dead-reckoning vector, the previous dead-reckoning vector may be communicated to the receiving game system using a previous message.

In distributed multiplayer games, game playing accuracy is measured according to the game playing experience as observed by end users in terms of accurate placement and movement of players/entities on distributed game systems (i.e., maximum game playing accuracy is achieved in the absence of network delay). According to such game playing accuracy, in physical time, players should experience identical movements of players/entities within the game space. In one embodiment, this notion of game playing accuracy may be defined using the following player/entity trajectories: (1) the trajectory of the player/entity at the receiving game system before the dead-reckoning vector is received and (2) the trajectory of the player/entity at the receiving game system after the dead-reckoning vector is received.

An export error associated with movement of the player/entity at the receiving game system before the dead-reckoning vector is received at the receiving game system is denoted as a before export error. An export error associated with movement of the player/entity at the receiving game system after the dead-reckoning vector is received at the receiving game system is denoted as an after export error. Both before export errors and after export errors are due to a deviation between the exported path on the sending game system and the placed path on the receiving game system (i.e., due to network delay in propagating dead-reckoning vectors from sending game systems to receiving game systems). In existing distributed multiplayer games, receiving game systems experience both before export errors and after export errors, thereby resulting in game-playing inaccuracies. The before export errors and after export errors may be better understood with respect to FIG. 2.

Figure 2:
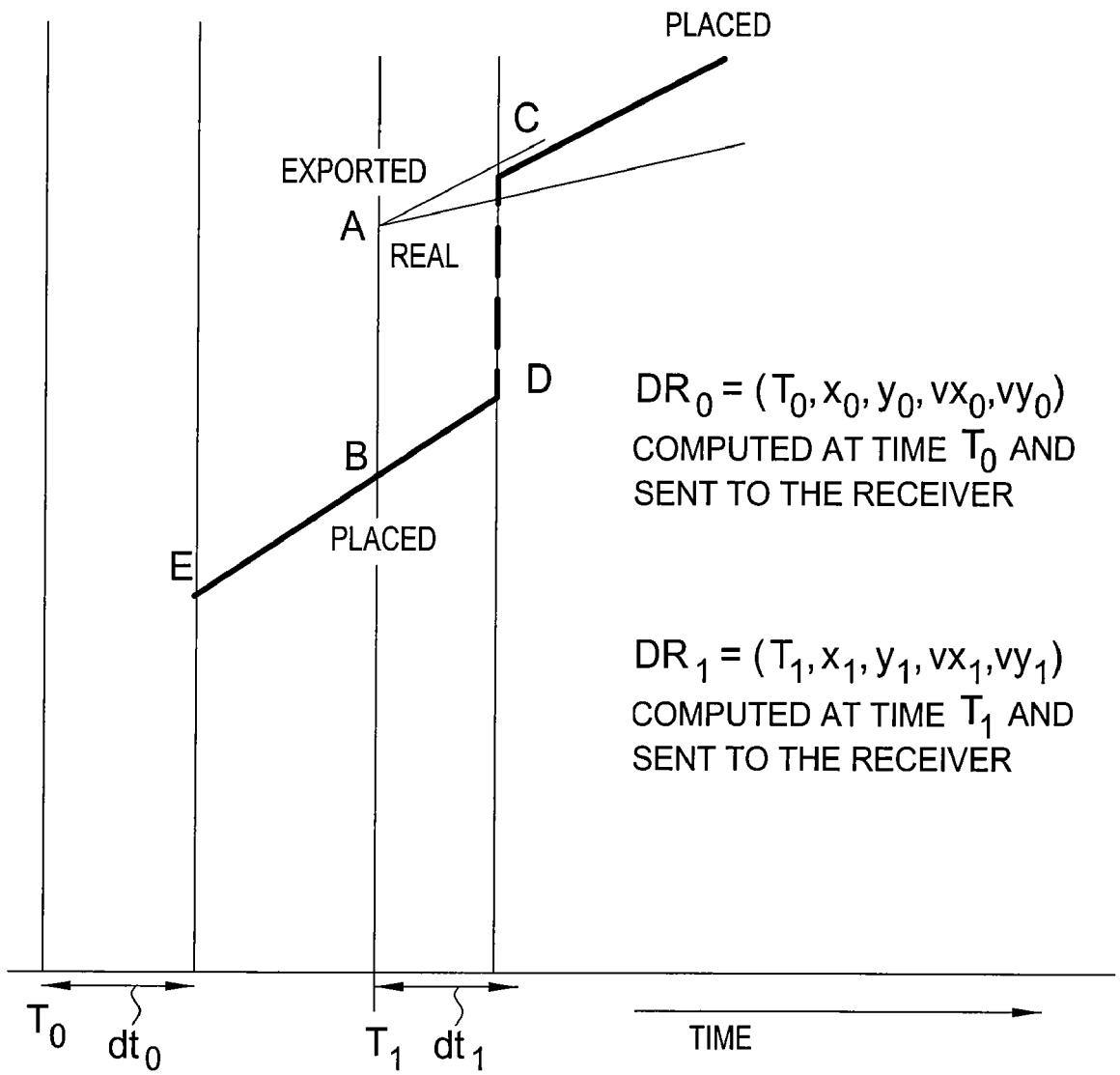
FIG. 2 depicts a model illustrating actual, exported, and placed paths associated with dead-reckoning vectors exchanged between a sending game system and a receiving game system.

FIG. 2 depicts a model illustrating actual, exported, and placed paths associated with dead-reckoning vectors exchanged between a sending game system and a receiving game system. Specifically, model 200 of FIG. 2 illustrates real paths, exported paths, and placed paths associated with the sending game system and receiving game system, as well as various errors resulting from exchanging of dead-reckoning vectors between the sending game system and the receiving game system. As depicted in FIG. 2, model 200 includes a time axis. For purposes of clarity, the time axis represents physical time with respect to a clock maintained by the sending game system. For purposes of clarity, model 200 of FIG. 2 is depicted and described with respect to a two-dimensional game space.

As depicted in FIG. 2, at a time $T_0$, a dead-reckoning vector $DR_0=(T_0, x_0, y_0, vx_0, vy_0)$ is computed for an entity by the sending game system. The dead-reckoning vector $DR_0$ is sent from the sending game system to the receiving game system. The dead-reckoning vector $DR_0$ is received at the receiving game system after a delay $dt_0$. The receiving game system places the entity at starting location $(x_0, y_0)$ as specified by dead-reckoning vector $DR_0$ (illustratively, point E). Since the entity continues to move within the game space on the sending game system during delay $dt_0$, without adaptation of the starting location, the starting location $(x_0, y_0)$ at which the entity is placed on receiving game system at time $T_0+dt_0$ is different from the current location of the entity on the sending game system at time $T_0+dt_0$. The trajectory of the placed path on the receiving game system is represented by path ED.

As depicted in FIG. 2, at a time $T_1$, an updated dead-reckoning vector $DR_1=(T_1, x_1, y_1, vx_1, vy_1)$ is computed for the entity by the sending game system. At time $T_1$, on the sending game system, due to the trajectory of the entity according to dead-reckoning vector $DR_0$ during the time from $T_0$ to $T_1$, the entity is located at the coordinates of point B at time $T_1$. At time $T_1$, due to computation of dead-reckoning vector $DR_1$, the entity is moved on the sending game system from the coordinates of point B to the coordinates of point A $(x_1, y_1)$. The dead-reckoning vector $DR_1$ is sent from the sending game system to the receiving game system. The dead-reckoning vector $DR_1$ is received at the receiving game system after a delay $dt_1$. Since the entity continues to move within the game space on the receiving game system (according to the trajectory specified by previously received dead-reckoning vector $DR_0$) during delay $dt_1$, at time $T_1+dt_1$ the entity is located at a point on the placed path associated with dead-reckoning vector $DR_0$ (illustratively, at point D).

In a distributed multiplayer game without the present invention (which cannot account for entity movements on the sending game system while an associated dead-reckoning vector is in transit to the receiving game system), the receiving game system moves the entity from point D to starting location $(x_1, y_1)$ as specified by dead-reckoning vector $DR_1$ (denoted as point H). Since the entity continues to move within the game space on the sending game system during delay $dt_1$, without adaptation of the starting location as defined by the present invention, the starting location $(x_1, y_1)$ at which the entity is placed on receiving game system at time $T_1+dt_1$ (illustratively, point H) is different from the current location of the entity on the sending game system at time $T_1+dt_1$.

As depicted in FIG. 2, coordinates of point A and point H are identical, however, since time is measure along the x-axis, the entity is located at the coordinates of point A on the sending game system at time $T_1$ while the entity is not rendered at the coordinates of point H on the receiving game system until time $T_1+dt_1$. At the physical time at which the entity is located at the coordinates of point H on the receiving game system $(T_1+dt_1)$, the trajectory of the entity on the sending game system is following the same path, however the entity is located at different coordinates on the sending game system (denoted as point C). Since the entity was located at the coordinates of point A $(x_1, y_1)$ at time $T_1$ on the sending game system, and only at later time $T_1+dt_1$ is the entity placed at the same coordinate position at the receiver, point C is ahead in the trajectory.

As described herein, even for game systems maintaining synchronized clocks, before export error due to network delay is unavoidable. As depicted in FIG. 2, dead-reckoning vector $DR_1$ is computed by the sending game system and sent to the receiving game system at time $T_1$, however, due to network delay, dead-reckoning vector $DR_1$ is not received at the receiving game system until time $T_1+dt_1$. Although the exported path based on DR1 at the sending game system at time T1 is the trajectory AC, prior to time $T_1+dt_1$, at the receiving game system, the associated entity is rendered at trajectory BD based on previous dead-reckoning vector $DR_0$. In other words, only at time $T_1+dt_1$ is the entity moved on the sending game system from point D to point C, from which point onwards the exported path from the sending game system is the same as the placed path on the receiving game system.

Figure 3:
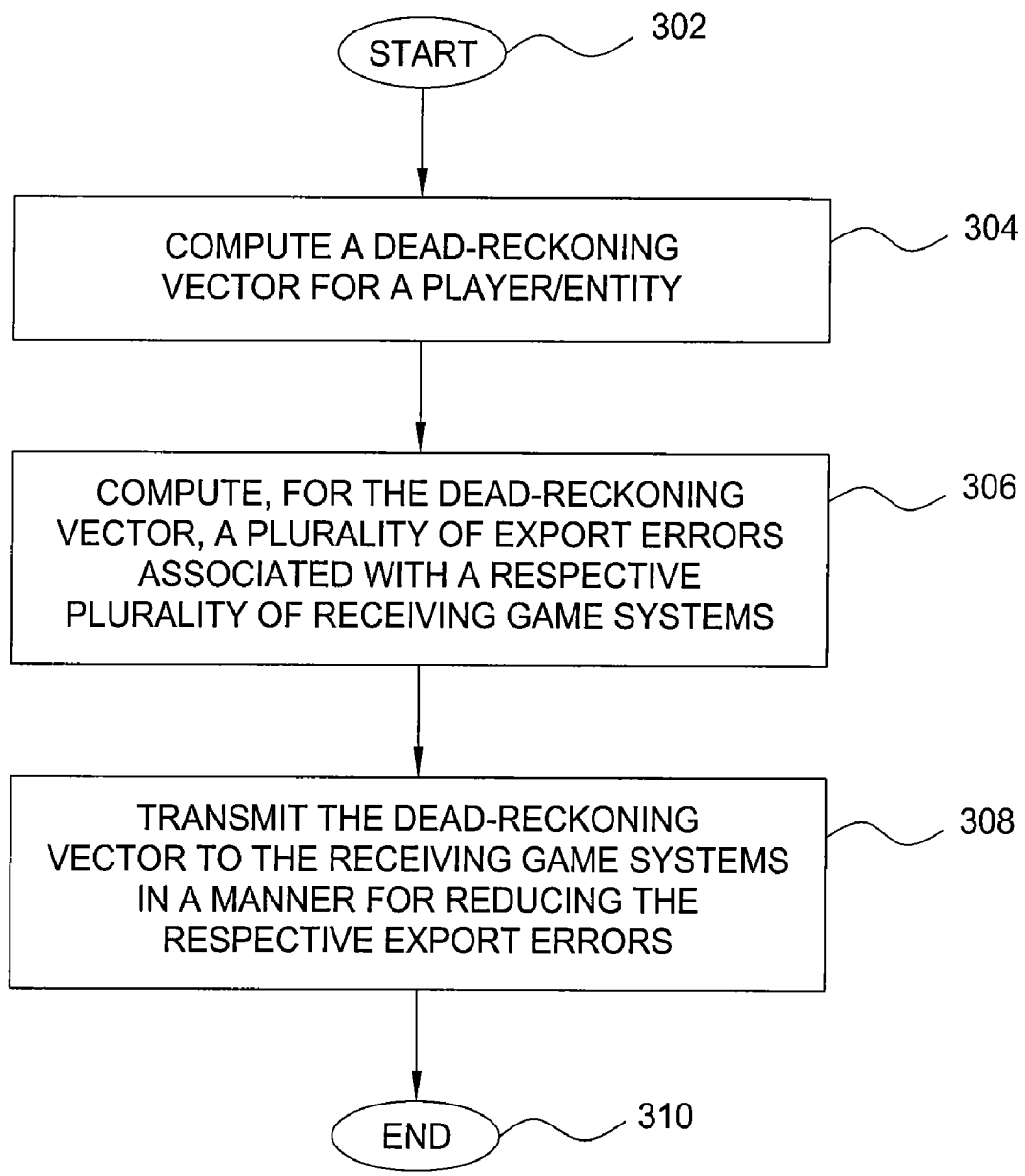
FIG. 3 depicts a method according to one embodiment of the present invention.

FIG. 3 depicts a method according to one embodiment of the present invention. Specifically, method 300 of FIG. 3 includes a method for equalizing a plurality of export errors associated with a respective plurality of receiving game systems for a dead-reckoning vector computed by a sending game system for a player/entity. Although depicted as being performed serially, those skilled in the art will appreciate that at least a portion of method 300 may be performed contemporaneously, or in a different order than presented in FIG. 3. The method 300 is entered at step 302 and proceeds to step 304.

At step 304, a dead-reckoning vector (which may also be denoted as a current message) is computed for a player/entity. At step 306, a plurality of export errors are computed. The export errors are associated with a respective plurality of receiving game systems to which the sending game system sends the dead-reckoning vector. In one embodiment, the export errors include accumulated export errors. In one embodiment, accumulated export errors may be computed as depicted and described herein with respect to FIG. 6. At step 308, the dead-reckoning vector is transmitted to the receiving game systems (as a respective plurality of current messages) in a manner for equalizing the respective export errors. At step 310, method 300 ends. In one embodiment, method 300 of FIG. 3 may be better understood with respect to FIG. 4-FIG. 7. In one embodiment, method 300 of FIG. 3 may be better understood with respect to FIG. 8-FIG. 9.

Figure 4:
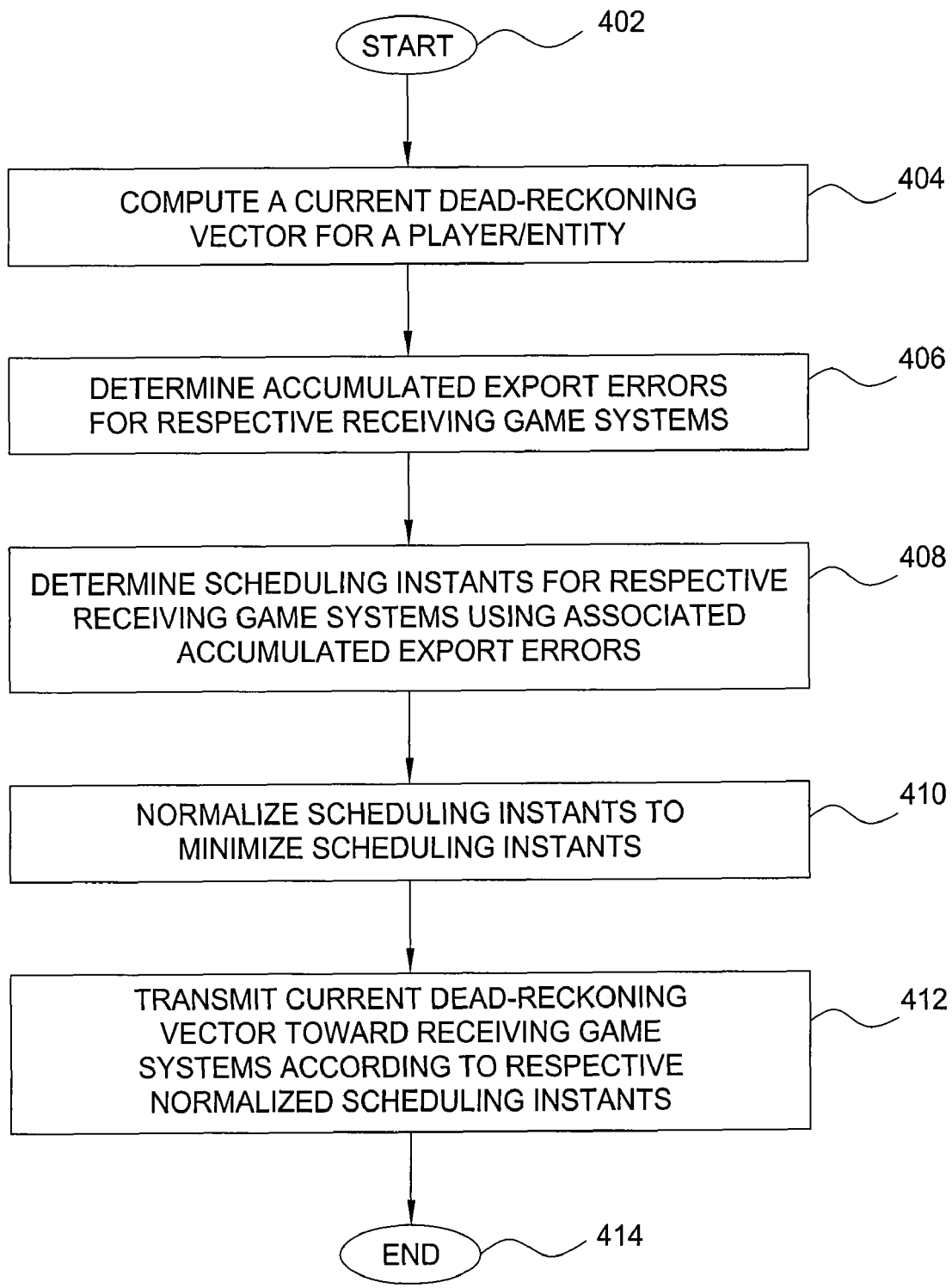
FIG. 4 depicts a method according to one embodiment of the present invention.

FIG. 4 depicts a method according to one embodiment of the present invention. In general, method 400 of FIG. 4 includes a method for equalizing a plurality of export errors associated with a respective plurality of receiving game systems for a dead-reckoning vector computed by a sending game system for a player/entity. In particular, method 400 of FIG. 4 includes a method for determining a plurality of scheduling instants associated with the respective receiving game systems for equalizing the respective export errors. Although depicted as being performed serially, those skilled in the art will appreciate that at least a portion of method 400 may be performed contemporaneously, or in a different order than presented in FIG. 4. The method 400 is entered at step 402 and proceeds to step 404.

At step 404, a current dead-reckoning vector is computed for a player/entity by a sending game system for transmission to a plurality of receiving game systems (e.g., for transmission as a plurality of current messages associated with the respective receiving game systems). At step 406, a plurality of accumulated export errors is determined for the respective plurality of receiving game systems. At step 408, a plurality of scheduling instants is determined for respective receiving game systems using the associated accumulated export errors. At step 410, the scheduling instants are normalized in a manner for minimizing the scheduling instants. At step 412, the current dead-reckoning vector is transmitted toward the receiving game systems according to the respective normalized scheduling instants. At step 414, method 400 ends. The method 400 of FIG. 4 may be better understood with respect to FIG. 5-FIG. 7.

Although primarily described herein with respect to using scheduling instants for equalizing export errors associated with respective receiving game systems, in one embodiment, export errors associated with respective receiving game systems may be equalized according to scheduling times (i.e., clock times at which the dead-reckoning vector is sent to the respective receiving game systems). In one embodiment, scheduling times associated with respective receiving game systems may be determined using respective scheduling instants. In one such embodiment, scheduling times associated with respective receiving game systems may be determined using respective normalized scheduling instants.

In one example, given three receiving game systems, three normalized scheduling instants may be computed (e.g., $\delta_1=0$, $\delta_2=20$ ms, $\delta_3=35$ ms). In this example, the sending game system may determine that transmission of the dead-reckoning vector begins at a start time To, and determine associated schedule times $T_1=T_0$, $T_2=T_0+20$ ms, and $T_3=T_0+35$ ms, respectively. In this example, rather than transmitting the dead-reckoning vector to the first receiving game system, waiting 20 ms, transmitting the dead-reckoning vector to the second receiving game system, waiting 15 ms and transmitting the dead-reckoning vector to the third receiving game system, the sending game system computes schedule times $T_1$, $T_2$, and $T_3$ and monitors a clock for detecting the respective schedule times (at which time transmission of the dead-reckoning vector to the respective receiving game system is initiated).

Figure 5:
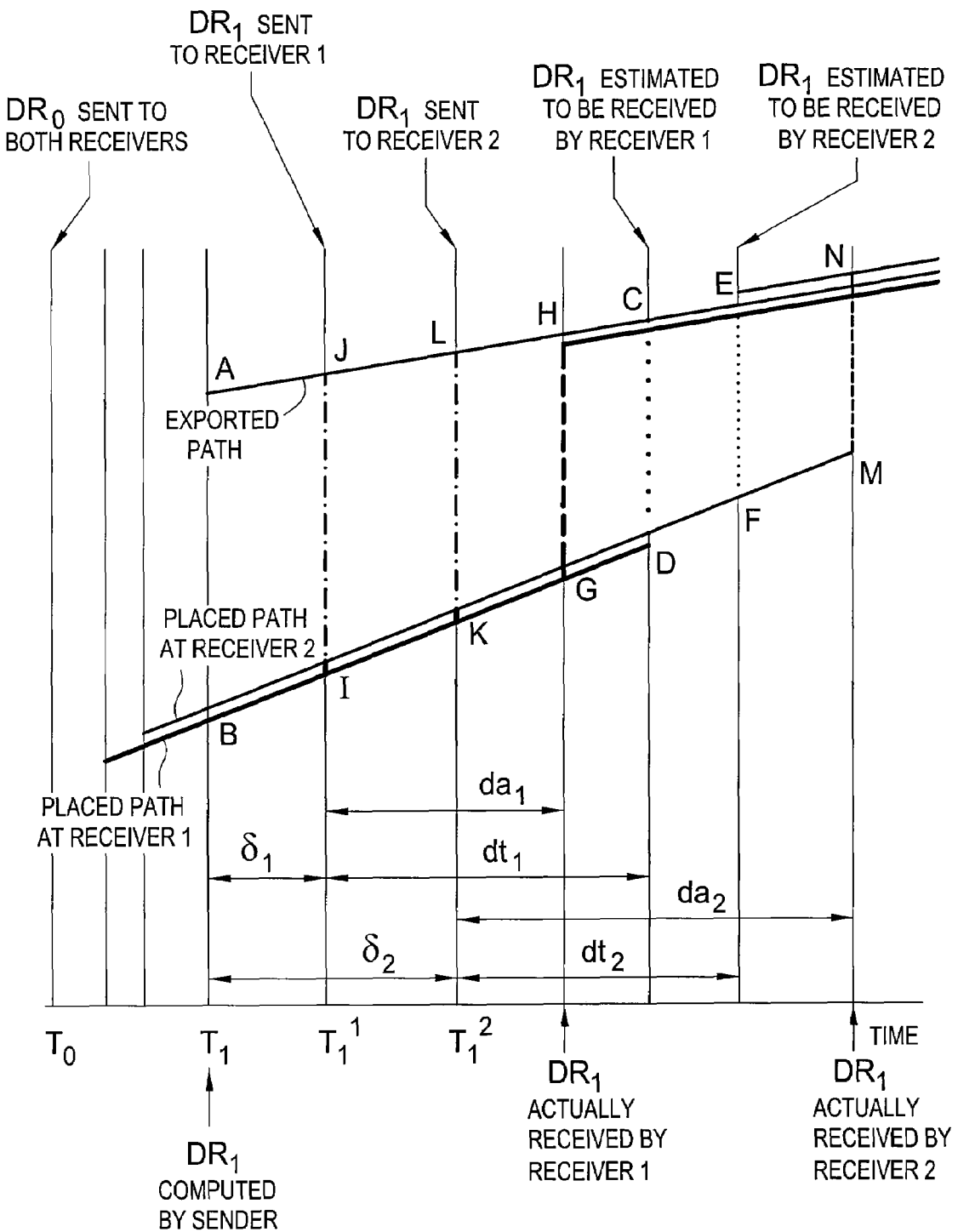
FIG. 5 depicts a model illustrating exported and placed paths associated with dead-reckoning vectors exchanged between a sending game system and a pair of receiving game systems.

FIG. 5 depicts a model illustrating exported and placed paths associated with dead-reckoning vectors exchanged between a sending game system and a pair of receiving game systems. Specifically, model 500 of FIG. 5 illustrates exported paths and placed paths associated with the sending game system and receiving game systems, as well as various errors resulting from exchanging of dead-reckoning vectors between the sending game system and the receiving game systems. As depicted in FIG. 5, model 500 includes a time axis. For purposes of clarity, the time axis represents physical time. For purposes of clarity, model 500 of FIG. 5 is depicted and described with respect to a two-dimensional game space. The points of the placed paths and exported paths not discussed with respect to FIG. 5 are discussed herein with respect to FIG. 6-FIG. 7.

As depicted in FIG. 5, at time $T_0$, the sending game system computes a dead-reckoning vector $DR_0$ associated with a player/entity, and transmits dead-reckoning vector $DR_0$ to two different receiving game systems (i.e., a first receiving game system (denoted as first receiver) and a second receiving game system (denoted as second receiver)). Upon receiving dead-reckoning vector $DR_0$, the receiving game systems move the location of the player/entity to match the exported path from the sending game system (i.e., the path of the player/entity is shown only from the point where the placed path matches the exported path for dead-reckoning vector $DR_0$).

As depicted in FIG. 5, at time $T_1$, the sending game system computes a dead-reckoning vector $DR_1$ associated with the player/entity, however, dead-reckoning vector $DR_1$ is not immediately sent to the first and second receiving game systems. The dead-reckoning vector $DR_1$ is sent to the first receiving game system according to a first scheduling instant $\delta_1$ (at time $T_1^1 = T_1 + \delta_1$). The dead-reckoning vector $DR_1$ is sent to the second receiving game system according to a second scheduling instant $\delta_2$ (at time $T_1^2 = T_1 + \delta_2$). In one embodiment, the sending game system includes the sending time stamps within the respective dead-reckoning vectors $DR_1$ sent to the first receiving game system ($DR_1 = (T_1, T_1^1, x_1, y_1, vx_1, vy_1)$) and the second receiving game system ($DR_1 = (T_2, T_1^2, x_2, y_2, vx_2, vy_2)$).

As depicted in FIG. 5, the sending game system determines an estimated propagation delay $dt_1$ (i.e., estimates the time at which the first receiving game system will receive dead-reckoning vector $DR_1$ and use receive dead-reckoning vector $DR_1$ to compute the current location of the player/entity and move the player/entity to the current location (denoted as point C), and that from this point onward the exported and placed paths become identical). In reality, however, the first receiving game system receives dead-reckoning vector $DR_1$ after an actual propagation delay $da_1$ (which is less than the estimated propagation delay $dt_1$ computed by the sending game system) and moves the corresponding player/entity to point H rather than point C.

As depicted in FIG. 5, the sending game system determines an estimated propagation delay $dt_1$ (i.e., estimates the time at which the first receiving game system will receive dead-reckoning vector $DR_1$ and use dead-reckoning vector $DR_1$ to compute the current location of the player/entity and move the player/entity from the current location on the first receiving game system (denoted as point D) to the current location specified by dead-reckoning vector $DR_1$ (denoted as point C), and that from this point onward the exported and placed paths become identical). In reality, however, the first receiving game system receives dead-reckoning vector $DR_1$ after an actual propagation delay $da_1$ (which is less than the estimated propagation delay $dt_1$ computed by the sending game system) and moves the corresponding player/entity to point H rather than point C.

As depicted in FIG. 5, the sending game system determines an estimate propagation delay $dt_2$ (i.e., estimates the time at which the second receiving game system will receive dead-reckoning vector $DR_1$ and use dead-reckoning vector $DR_1$ to compute the current location of the player/entity and move the player/entity from the current location on the second receiving game system (denoted as point F) to the current location specified by dead-reckoning vector $DR_1$ (denoted as point E), and that from this point onward the exported and placed paths become identical). In reality, however, the second receiving game system receives dead-reckoning vector $DR_1$ after an actual propagation delay $da_2$ (which is greater than the estimated propagation delay $dt_2$ computed by the sending game system) and moves the corresponding player/entity to point N rather than point E.

Figure 6:
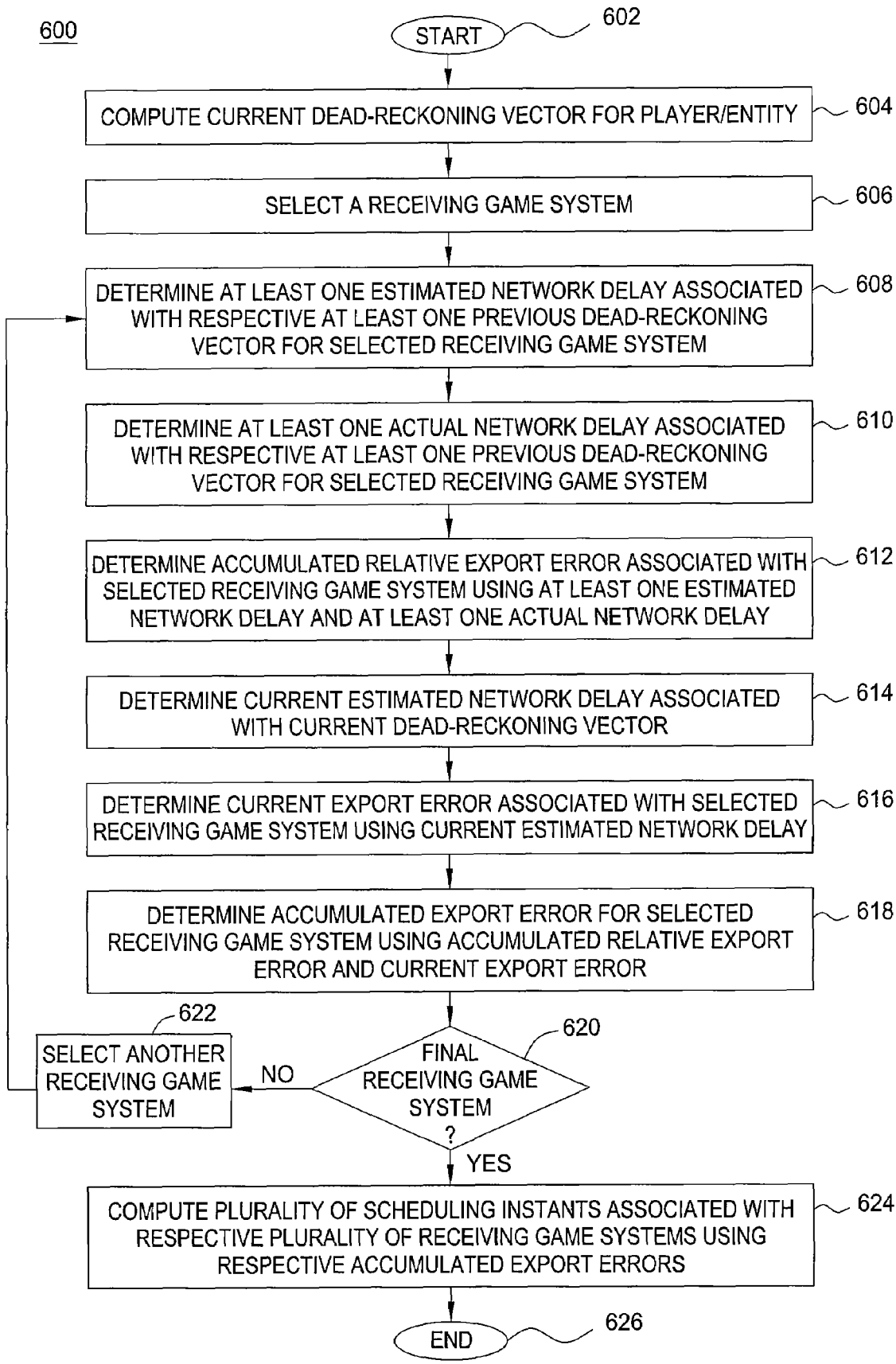
FIG. 6 depicts a method according to one embodiment of the present invention.

FIG. 6 depicts a method according to one embodiment of the present invention. Specifically, method 600 of FIG. 6 includes a method for determining accumulated export errors associated with respective receiving game systems. Although primarily depicted and described with respect to determining accumulated export errors for determining scheduling instants adapted for equalizing the accumulated export errors at the receiving game systems, accumulated export errors may be determined within various other contexts adapted for equalizing the accumulated export errors at the receiving game systems. Although depicted as being performed serially, those skilled in the art will appreciate that at least a portion of method 600 may be performed contemporaneously, or in a different order than presented in FIG. 6. The method 600 is entered at step 602 and proceeds to step 604.

At step 604, a current dead-reckoning vector (denoted as dead-reckoning vector $DR_i$) is computed for a player/entity. At step 606, a receiving game system is selected by the sending game system to compute an accumulated export error associated with the selected receiving game system. At step 608, at least one previous estimated propagation delay associated with respective at least one previous dead-reckoning vector (e.g., $DR_{i-1}$, $DR_{i-2}$, and so on) is determined for the selected receiving game system. At step 610, at least one previous actual propagation delay associated with respective at least one previous dead-reckoning vector (e.g., $DR_{i-1}$, $DR_{i-2}$, and so on) is determined for the selected receiving game system. At step 612, an accumulated relative export error is determined for the selected receiving game system using the at least one previous estimated propagation delay and respective at least one previous actual propagation delay.

At step 614, a current estimated propagation delay associated with the current dead-reckoning vector is determined. At step 616, a current export error associated with the current dead-reckoning vector is determined for the selected receiving game system. At step 618, an accumulated export error is determined for the selected receiving game system using the accumulated relative export error and the current export error. At step 620, a determination is made as to whether the final receiving game system has been selected for processing (e.g., whether an accumulated export error has been computed for each receiving game system). If the final receiving game system has been selected, method 600 proceeds to step 624. If the final receiving game system has not been selected, method 600 proceeds to step 622.

At step 622, another receiving game system (i.e., a receiving game system not previously selected with respect to the current dead-reckoning vector) is selected for determining an accumulated export error associated with the receiving game system. From step 622, method 600 returns to step 608. At step 624, scheduling instants associated with the respective receiving game systems are computed. The scheduling instants associated with the receiving game systems are determined using the respective accumulated export errors. The scheduling instants are determined in a manner for attempting to equalize the accumulated export errors across the receiving game systems. At step 626, method 600 ends.

The computation of accumulated export errors associated with receiving game systems may be better understood with respect to the following description including exemplary embodiments for computing scheduling instants associated with respective receiving game systems. The computation of scheduling instants associated with receiving game systems may be better understood with respect to the following description including exemplary embodiments for computing accumulated export errors, accumulated relative export errors, and current export errors. Furthermore, computation of accumulated export errors, accumulated relative export errors, and current export errors may be better understood with respect to the following description including exemplary embodiments of the present invention.

From the perspective of the sending game system, since the sending game system uses estimated propagation delay $dt_1$ to compute an estimated export error, the estimated export error at the first receiving game system due to $DR_1$ (i.e., estimated current message export error for the first receiving game system, where the current message conveys $DR_1$ to the first receiving game system) is given by $Err(DR_1, T_1, T_1+\delta_1+dt_1)$, which, with respect to FIG. 5, is equal to the integral of the distance between trajectories AC and DB over the time interval $[T_1, T_1+\delta_1+dt_1]$. Similarly, from the perspective of the sending game system, since the sending game system uses estimated propagation delay $dt_2$ to compute an estimated export error, the estimated export error at the second receiving game system due to $DR_1$ (i.e., estimated current message export error for the second receiving game system, where the current message conveys $DR_1$ to the second receiving game system) is given by $Err(DR_1, T_1, T_1+\delta_2+dt_2)$, which, with respect to FIG. 5, is equal to the integral of the distance between trajectories AE and DF over the time interval $[T_1, T_1+\delta_2+dt_2]$.

As described herein, $Err(DR_1, T_1, T_1+\delta_1+dt_1)$ and $Err(DR_1, T_1, T_1+\delta_2+dt_2)$ include estimated export errors. Since estimated export errors $Err(DR_1, T_1, T_1+\delta_1+dt_1)$ and $Err(DR_1, T_1, T_1+\delta_2+dt_2)$ are computed using previously received propagation delay feedback information, and propagation delays vary continuously, actual propagation delays typically deviate from estimated propagation delays. As such, actual export errors experienced by the first receiving game system and the second receiving game system for dead-reckoning vector $DR_1$ due to respective actual propagation delays may be less than or greater than respective estimated export errors. The difference between an estimated export error and an actual export error is denoted as a relative export error.

As depicted in FIG. 5, since actual propagation delay experienced by dead-reckoning vector $DR_1$ from the sending game system to the first receiving game system is $da_1$, the actual export error induced by dead-reckoning vector $DR_1$ at the first receiving game system is given by $Err(DR_1, T_1, T_1+\delta_1+da_1)$. In other words, estimated export error computed by the sending game system has an associated actual export error which may only be computed by the sending game system after the sending game system receives propagation delay feedback information for the delivery of dead-reckoning vector $DR_1$ from the first receiving game system (i.e., after the sending game system receives actual propagation delay $da_1$ from the first receiving game system). The first receiving game system computes actual propagation delay $da_1$ using vector send time $T_1^1=T_1+\delta_1$ (which is appended to dead-reckoning vector $DR_1$ by the sending game system) and local vector receive time (determined by the first receiving game system).

As depicted in FIG. 5, since actual propagation delay experienced by dead-reckoning vector $DR_1$ from the sending game system to the second receiving game system is $da_2$, the actual export error induced by dead-reckoning vector $DR_1$ at the first receiving game system is given by $Err(DR_1, T_1, T_1+\delta_2+da_2)$. In other words, estimated export error computed by the sending game system has an associated actual export error which may only be computed by the sending game system after the sending game system receives propagation delay feedback information for the delivery of dead-reckoning vector $DR_1$ from the second receiving game system (i.e., after the sending game system receives actual propagation delay $da_2$ from the second receiving game system). The second receiving game system computes actual propagation delay $da_2$ using vector send time $T_1^1=T_1+\delta_2$ (which is appended to dead-reckoning vector $DR_1$ by the sending game system) and local vector receive time (determined by the second receiving game system).

Using estimated export error $Err(DR_1, T_1, T_1+\delta_1+dt_1)$ and actual export error $Err(DR_1, T_1, T_1+\delta_1+da_1)$ computed by the sending game system, relative export error for the first receiving game system (denoted as $R_1$) may be computed as: $R_1=Err(DR_1, T_1, T_1+\delta_1+dt_1)-Err(DR_1, T_1, T_1+, \delta_1+da_1)=Err(DR_1, T_1, T_1+\delta_1+dt_1, T_1+\delta_1+da_1)$. Using estimated export error $Err(DR_1, T_1, T_1+\delta_2+dt_2)$ and actual export error $Err(DR_1, T_1, T_1+\delta_2+da_2)$ computed by the sending game system, relative export error for the second receiving game system (denoted as $R_2$) may be computed as: $R_2=Err(DR_1, T_1, T_1+\delta_2+dt_2)-Err(DR_1, T_1, T_1+\delta_2+da_2)=Err(DR_1, T_1, T_1+\delta_2+dt_2, T_1+\delta_2+da_2)$. As depicted in FIG. 5, with respect to the first receiving game system, since $da_1<dt_1$, $R_1>0$, and, with respect to the second receiving game system, since $da_2>dt_2$, $R_2<0$. As such, relative export error is computed by the sending game system using propagation delay feedback information.

As described herein, the sending game system equalizes accumulated export errors for each receiving game system for each dead-reckoning vector exported by the sending game system. The sending game system computes estimated propagation delays $dt_1$ and $dt_2$ associated with the first and second receiving game systems, respectively, such that at time $T_1$ (the time at which dead-reckoning vector $DR_1$ is computed by the sending game system) the sending game system has an estimate of the length of time it may take respective messages conveying dead-reckoning vector $DR_1$ to reach the first and second receiving game systems. The sending game system may use estimated propagation delays $dt_1$ and $dt_2$ to compute estimated export errors $Err(DR_1, T_1, T_1+\delta_1+dt_1)$ and $Err(DR_1, T_1, T_1+\delta_2+dt_2)$ for the first and second receiving game systems, respectively.

As described herein, estimated export errors $Err(DR_1, T_1, T_1+\delta_1+dt_1)$ and $Err(DR_1, T_1, T_1+\delta_2+dt_2)$ associated with first and second receiving game systems, respectively, are a function of estimated propagation delays $dt_1$ and $dt_2$ and scheduling instants $\delta_1$ and $\delta_2$, respectively. In order to equalize export errors due to dead-reckoning vector $DR_1$ at the first receiving game system and the second receiving game systems, the sending game system must compute scheduling instants $\delta_1$ and $\delta_2$ such that $Err(DR_1, T_1, T_1+\delta_1+dt_1)=Err(DR_1, T_1, T_1+\delta_2+dt_2)$. As described herein, this formulation assumes previous correction of export errors associated with previous dead-reckoning vectors (e.g., $DR_0$, $DR_{-1}$, and the like).

In practical distributed gaming systems, at time $T_1$ at which dead-reckoning vector $DR_1$ is computed by the sending game system, relative export errors associated with previous dead-reckoning vectors may have accumulated (denoted as accumulated previous message export errors). The accumulated relative export error up to dead-reckoning vector $DR_1$ for receiving game system j may be represented as $R_j^i$. In such practical systems, in order to correct for such accumulated relative export errors, the sending game system compute scheduling instants $\delta_1$ and $\delta_2$ such that $[R_1^0+\text{Err}(DR_1, T_1, T_1+\delta_1+dt_1)]=[R_2^0+\text{Err}(DR_1, T_1, T_1+\delta_2+dt_2)]$. The $\delta$ values determine the scheduling instants of the dead-reckoning vector DR for respective receiving game systems.

As such, the present invention attempts to reduce the estimated export errors associated with respective receiving game systems for a current dead-reckoning vector (that is transmitted to the respective receiving game systems using respective current messages) and the accumulated relative export errors associated with respective receiving game systems for one or more previous dead-reckoning vectors (that are transmitted to the respective receiving game systems using respective pluralities of previous messages). The present invention attempts to reduce the estimated export errors (denoted as estimated current message export errors) and the accumulated relative export errors (denoted as accumulated previous message export errors) across the associated receiving game systems at the time at which the current dead-reckoning vector is transmitted from the sending game system to the receiving game systems using the respective current messages.

In order to determine scheduling instants $\delta_{i+1}$, an assumption may be made that propagation delay feedback for dead-reckoning vector $DR_i$ is received at the sending game system before the sending game system computes scheduling instants $\delta_{i+1}$ for dead-reckoning vector $DR_{i+1}$. In one embodiment, $S_m^i$ may denote estimated export error for receiving game system m used for computing scheduling instants for dead-reckoning vector $DR_i$ and $A_m^i$ may denote accumulated relative export error for receiving game system m computed using propagation delay feedback information received from receiving game system m for dead-reckoning vector $DR_i$. In one such embodiment, $R_m^i=A_m^i-S_m^i$. In order to compute scheduling instants $\delta_i$ for dead-reckoning vector $DR_i$, for any pair of receiving game systems m and n, the sending game system ensures that $R_m^{i-1}+S_m^i=R_n^{i-1}+S_n^i$ to attempt to equalize accumulated export error across all receiving game systems, for each dead-reckoning vector, for each scheduling instant.

As described herein, scheduling instants $\delta_1$ and $\delta_2$ may be computed by the sending game system by computing estimated export errors $\text{Err}(DR_1, T_1, T_1+\delta_2+dt_1)$ and $\text{Err}(DR_1, T_1, T_1+\delta_2+dt_2)$ for the first receiving game system and the second receiving game system, respectively. As described herein, the sending game system previously computed relative export errors associated with the first receiving game system and second receiving game system for dead-reckoning vector $DR_0$ (denoted as $R_1^0$ and $T_2^0$, respectively). Although described herein with respect to computing scheduling instant $\delta_1$ for the first receiving game system by computing estimated export errors $\text{Err}(DR_1, T_1, T_1+\delta_1+dt_1)$, similar processing may be performed for computing scheduling instant $\delta_2$ for the second receiving game system by computing estimated export errors $\text{Err}(DR_1, T_1, T_1+\delta_2+dt_2)$.

As described herein, estimated export error $\text{Err}(DR_1, T_1, T_1+\delta_2+dt_1)$ is equal to the integral of the distance between the trajectory due to dead-reckoning vector $DR_1$ (illustratively, trajectory AC) and the trajectory due to dead-reckoning vector $DR_0$ (illustratively, trajectory BD). From dead-reckoning vectors $DR_0$ and $DR_1$, point A is $(X_1, Y_1)=(x_1, y_1)$ and point B is $(X_0, Y_0)=(x_0+(T_1-T_0)*vx_0, y_0+(T_1-T_0)*vy_0)$. The trajectories AC and BD may be represented as respective functions of time as follows: $(X_1(t), Y_1(t))=(X_1+(vx_1)(t), Y_1+(vy_1)(t))$ and $(X_0(t), Y_0(t))=(X_0+(vx_0)(t), Y_0+(vy_0)(t))$. Using this formulation, the distance between the trajectory due to dead-reckoning vector $DR_1$ and the trajectory due to dead-reckoning vector $DR_0$ may be simplified.

The distance between the trajectories due to dead-reckoning vectors $DR_1$ and $DR_0$ may be computed as: $\text{dist}(t)=\text{SQRT}[(X_1(t)-X_0(t))^2+(Y_1(t)-Y_0(t))^2]=\text{SQRT}[((X_1-X_0)+(vx_1-vx_0)t)^2+((Y_1-Y_0)+(vy_1-vy_0)t)^2]=\text{SQRT}[((vx_1-vx_0)^2+(vy_0-vy_0)^2)t^2+2((X_1-X_0)(vx_0-vx_0)+(Y_1-Y_0)(vy_1-vy_0))t+(X_1-X_0)^2+(y_1-y_0)^2]$. The distance may be simplified as: $\text{dist}(t)=\text{SQRT}[at^2+bt+c]$, where $a=[(vx_1-vx_0)^2+(vy_1-vy_0)^2]$, $b=[2((X_1-X_0)(vx_1-vx_0)+(Y_1-Y_0)(vy_0-vy_0))]$, and $c=[(X_1-X_0)^2+(Y_1-Y_0)^2]$. Using this simplified distance, $\text{Err}(DR_1, t_1, t_2)$ for some time interval $[t_1, t_2]$ may be expressed as an interval of $[\text{dist}(t)\,dt]$ over the time interval $[t_1, t_2]$ as follows:

$$\int_{t_1}^{t_2} \text{dist}(t)\,dt = \int_{t_1}^{t_2} \sqrt{at^2+bt+c}\,dt = A + B - C, \text{ where:}$$

$$A = \frac{(2at+b)\sqrt{at^2+bt+c}}{4a}$$

$$B = \frac{1}{2}\ln\left(\frac{\frac{1}{2b}+at}{\sqrt{a}} + \sqrt{at^2+bt+c}\right)c\frac{1}{\sqrt{a}}$$

$$C = \frac{1}{8}\ln\left(\frac{\frac{1}{2b}+at}{\sqrt{a}} + \sqrt{at^2+bt+c}\right)b^2 a^{-\frac{3}{2}}$$

Using this solution for the first receiving game system, estimated export error $\text{Err}(DR_1, T_1, T_1+\delta_1+dt_1)$ associated with the first receiving game system may be computed by applying appropriate limits to the solution. Similarly, although not explicitly described, a similar solution may be established for the second receiving game system. Using this similar solution for the second receiving game system, estimated export error $\text{Err}(DR_1, T_1, T_1+\delta_2+dt_2)$ associated with the second receiving game system may be computed by applying appropriate limits to this solution. Using estimated export errors $\text{Err}(DR_1, T_1, T_1+\delta_1+dt_1)$ and $\text{Err}(DR_1, T_1, T_1+\delta_2+dt_2)$ associated with the first receiving game system and the second receiving game system, respectively, scheduling instants $\delta_1$ and $\delta_2$ may be computed by the sending game system for the first and second receiving game systems, respectively.

As described herein, the sending game system computes scheduling instants $\delta_1$ and $\delta_2$ such that $[R_1^0+\text{Err}(DR_1, T_1, T_1+\delta_1+dt_1)]=[R_2+\text{Err}(DR_1, T_1, T_1+\delta_2+dt_2)]$. If accumulated relative export errors $R_1^0$ and $R_2^0$ equal zero, the sending game system computes scheduling instants $\delta_1$ and $\delta_2$ such that $\text{Err}(DR_1, T_1, T_1+\delta_1+dt_1)=\text{Err}(DR_1, T_1, T_1+\delta_2+dt_2)$, which holds if $\delta_1+dt_1=\delta_2+dt_2$. In other words, in the absence of accumulated relative export error, the sending game system would select scheduling instants $\delta_1$ and $\delta_2$ to counteract differences in delays to the respective first and second receiving game systems, such that the first and second receiving game systems receive the dead-reckoning vector at substantially the same time. As described herein, since the sending game system is unable to a priori determine propagation delays associated with receiving game systems, accumulated relative export errors from previous dead-reckoning vectors cannot equal zero.

$$R_1^0 + \int_{T_1}^{T_1+\delta_1+dt_1} dist(t)\,dt = R_2^0 + \int_{T_1}^{T_1+\delta_{21}+dt_{21}} dist(t)\,dt$$

$$R_1^0 + \int_{T_1}^{T_1+dt_1} dist(t)\,dt + \int_{T+dt_1}^{T_1+dt_1+\delta_1} dist(t)\,dt =$$

$$R_2^0 + \int_{T_1}^{T_1+dt_2} dist(t)\,dt + \int_{T+dt_2}^{T_1+dt_2+\delta_2} dist(t)\,dt$$

$$E_1 + \int_{T+dt_1}^{T_1+dt_1+\delta_1} dist(t)\,dt = E_2 + \int_{T+dt_2}^{T_1+dt_2+\delta_2} dist(t)\,dt$$

As described herein, accumulated relative export errors $R_1^0$ and $R_2^0$ associated with the first and second receiving game systems, respectively, are estimated by the sending game system for each dead-reckoning vector computed by the sending game system. The error components $E_1$ and $E_2$ may be a priori computed by the sending game using system estimated propagation delays $dt_1$ and $dt_2$ associated with the first and second receiving game systems, respectively. In one embodiment, upon computing a dead-reckoning vector, the sending game system computes $E_i$ values for respective receiving game systems using the accumulated relative export errors $R_i^0$ and estimated propagation delays $dt_i$.

In one embodiment, in order to make the game as fast as possible, the sending game system computes scheduling instants δ to be as small as possible such that the dead-reckoning vector is sent to the respective receiving game systems as soon as possible (subject to the fairness requirement of the present invention by which equalization of relative export errors associated with receiving game systems is achieved). In one such embodiment, the sending game system computes $E_i$ values for respective receiving game systems, and selects the smallest $E_i$ value (denoted as $E_k$). The sending game system sets scheduling instants $\delta_k$ equal to zero (i.e., sets the smallest scheduling instant δ a equal to zero) and computes the remaining scheduling instants δ according to the following inequality:

$$E_k = E_i + \int_{T+dt_1}^{T_1+dt_i+\delta_i} dist(t)\,dt \quad \forall\, i,\, 1 \le i \le N,\, i \ne k$$

The scheduling algorithm for scheduling transmitting of dead-reckoning vectors from a sending game system to receiving game systems determines scheduling instants δ adapted for equalizing accumulated export errors associated with respective sending game systems, and transmits the dead-reckoning vectors to the receiving game systems according to the scheduling instants δ. The sending game system computes dead-reckoning vector $DR_i$ at time $T_i$. The sending game system computes accumulated relative export errors $R_k^{i-1}$ (for all k) and scheduling instants $\delta_k^i$ (for all k) using estimated propagation delays $dt_k$, where estimated network delays $dt_k$ are computed using actual network delays $da_k$ received from receiving game systems.

As described herein, the sending game system transmits the dead-reckoning vectors to the receiving game systems according to scheduling instants $\delta_k^i$. The dead-reckoning vector is received by the receiving game systems after actual propagation delays $da_k$. The receiving game systems compute respective actual propagation delays $da_k$. In one embodiment, receiving game systems compute respective actual propagation delays $da_k$ using time stamps included within the dead-reckoning vectors. The receiving game systems transmit respective actual propagation delays $da_k$ to the sending game system for use in computing accumulated relative export errors for use in computing scheduling instants δ for future dead-reckoning vectors.

The present invention is primarily described herein according to an implicit assumption that dead-reckoning vector $DR_i$ is transmitted to all receiving game systems before a decision is made to compute a subsequent dead-reckoning vector $DR_{i+1}$, and that the respective actual propagation delays $da_k$ corresponding to dead-reckoning vector $DR_i$ are received by the sending game system before the sending game system computes the subsequent dead-reckoning vector $DR_{i+1}$ (so that the sending game system can compute accumulated relative export errors $R_k^{i+1}$ for use in computing scheduling instants $\delta_k^{i+1}$). In actual operation of the present invention, as depicted and described herein with respect to FIG. 7, at least a portion of such assumptions may not hold.

Figure 7:
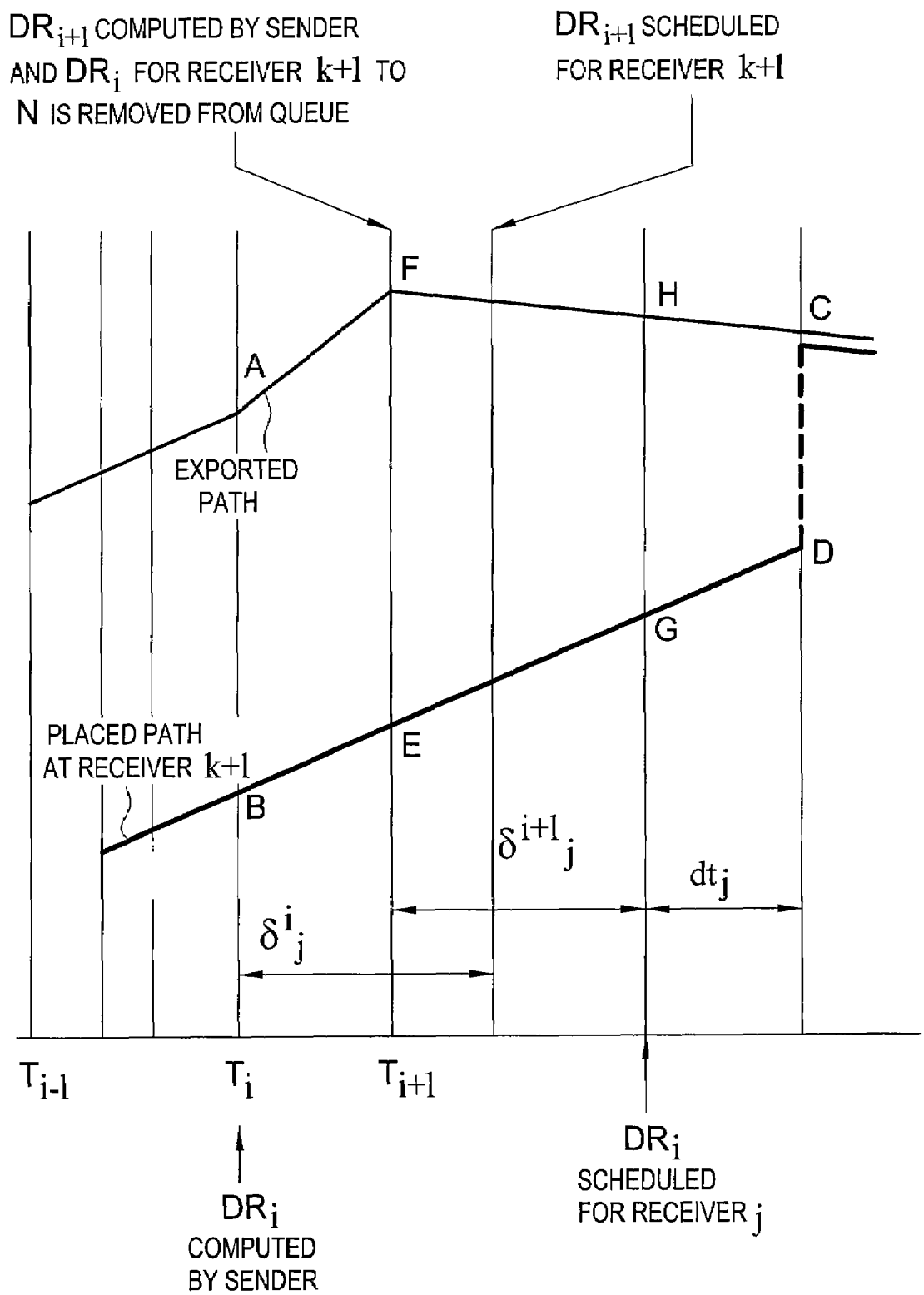
FIG. 7 depicts a model illustrating exported and placed paths associated with a current dead-reckoning vectors computed by a sending game system for transmission to a receiving game system where a subsequent dead-reckoning vector is computed by the sending game system before the current dead-reckoning vector is transmitted by the sending game system.

FIG. 7 depicts a model illustrating exported and placed paths associated with a current dead-reckoning vectors computed by a sending game system for transmission to a receiving game system where a subsequent dead-reckoning vector is computed by the sending game system before the current dead-reckoning vector is transmitted by the sending game system. As depicted in FIG. 7, model 700 includes a time axis. For purposes of clarity, the time axis represents physical time. For purposes of clarity, model 700 of FIG. 7 is depicted and described with respect to a two-dimensional game space. The points of the placed paths and exported paths of model 700 of FIG. 7 may be better understood with respect to the following description of exemplary embodiments in which a subsequent dead-reckoning vector is computed by a sending game system before a current dead-reckoning vector is sent to the receiving game system.

In one embodiment, assume dead-reckoning vector $DR_i$ is scheduled for transmission to receiving game systems according to scheduling instants $\delta_k^i$ such that $\delta_1^i < \delta_2^i < \ldots < \delta_N^i$, and dead-reckoning vector $DR_{i+1}$ must be computed (e.g., because the real path associated with dead-reckoning vector $DR_i$ has deviated from the exported path associated with dead-reckoning vector $DR_i$ by a threshold). The dead-reckoning vector $DR_{i+1}$ is to be computed at time $T_{i+1}$ where $T_i+\delta_k^i < T_{i+1} < T_i+\delta_{k+1}^i$ indicating that, at time $T_{i+1}$ at which the next dead-reckoning vector must be sent to receiving game systems, dead-reckoning vector $DR_i$ has only been sent to a portion of the receiving game systems (i.e., to receiving game systems up to k in the scheduled order computed for dead-reckoning vector $DR_i$).

In this embodiment, the scheduled delay ordering queue is flushed such that the dead-reckoning vector $DR_i$ is not sent to the remaining receiving game systems; rather, the next dead-reckoning vector $DR_{i+1}$ is sent to the remaining receiving game systems. In this embodiment, for those receiving game systems to which dead-reckoning vector $DR_i$ has already been sent, assume that associated actual propagation delays $da_j$ (for $1 \le j \le k$) have been received by the sending game system. In other words, for the receiving game servers to which the dead-reckoning vector $DR_i$ is not sent, errors $E_j^i$ (for $1 \le j \le k$) are computed and for the receiving game servers to which the dead-reckoning vector $DR_i$ is sent, errors $E_j^i$ (for $k+1 \le j \le N$) do not apply.

In this embodiment, consider a receiving game system to which the dead-reckoning vector DR is not sent (denoted as receiving game system j). For receiving game system j, at the time at which dead-reckoning vector $DR_{j+1}$ is to be scheduled, associated scheduling instant $\delta_j^{i+1}$ needs to be computed. The total export error is the sum of: (1) accumulated relative export errors $R_j^{i-1}$ at time $T_i$ at which scheduling instants for dead-reckoning vector $DR_i$ were computed by the sending game system, and (2) the integral of the distance between trajectories AC and BD (depicted herein with respect to FIG. 7) over time interval $[T_i, T_i+\delta_k^{i+1}+dt_j]$. The integral of the distance between the trajectories AC and BD is given by $Err(DR_i, T_i, T_{i+1})+Err(DR_{i+1}, T_{i+1}, T_{i+1}+\delta_k^{i+1}+dt_j)$.

Although the previous embodiment was described with respect to an assumption in which the respective actual propagation delays $da_k$ corresponding to dead-reckoning vector $DR_i$ are received by the sending game system before the sending game system computes the subsequent dead-reckoning vector $DR_{i+1}$ (so that the sending game system can compute accumulated relative export errors $R_k^{i+1}$ for use in computing scheduling instants $\delta_k^{i+1}$), in one embodiment, at least a portion of actual propagation delays $da_k$ associated with dead-reckoning vector $DR_i$ are not received by the sending game system before the sending game system computes the subsequent dead-reckoning vector $DR_{i+1}$.

In this embodiment, accumulated relative export errors $R_k^{i+1}$ cannot be computed. The computation of scheduling instants $\delta_k^i$ for dead-reckoning vector $DR_{i+1}$ may be assumed to be equal to zero. Since an assumption is made that a reliable communication mechanism is used for transmitting actual propagation delays $da_k$ to the sending game system, when the actual propagation delays $da_k$ arrive at the sending game system, accumulated relative export errors $R_k^i$ is computed and accumulated to future relative export errors (e.g., accumulated relative export errors $R_k^{i+1}$ if actual propagation delay $da_k$ is received before dead-reckoning vector $DR_{i+2}$ is computed by the sending game system), and used in the computation of scheduling instant $\delta_k$ when a future dead-reckoning vector is to be scheduled (e.g., dead-reckoning vector $DR_{i+2}$).

Although determination of accumulated export errors associated with respective receiving game systems is primarily depicted and described with respect to an embodiment in which a scheduling algorithm is implemented for equalizing the accumulated export errors associated with the respective receiving game systems, in one embodiment, accumulated export errors may be determined for various other systems utilizing various other algorithms for equalizing accumulated export errors associated with the respective receiving game systems. In such embodiments, depicted and described herein with respect to FIG. 8 and FIG. 9, budget-based algorithms, determined using accumulated export errors, may be utilized for equalizing accumulated export errors associated with the respective receiving game systems.

Although primarily described herein with respect to an embodiment in which a scheduling algorithm is implemented for equalizing the accumulated export errors associated with the respective receiving game systems, since dead-reckoning vectors in such embodiments are typically transmitted to all receiving game systems, and propagation delay between the sending game system and receiving game systems is unavoidable, before export error associated with the most distant receiving game system with typically be greater than respective before export errors associated with the other receiving game systems. In order to mitigate this imbalance in before export errors, dead-reckoning vectors may be selectively transmitted to different receiving game systems with different respective transmission frequencies using budget-based algorithms, as depicted and described herein with respect to FIG. 8 and FIG. 9.

Figure 8:
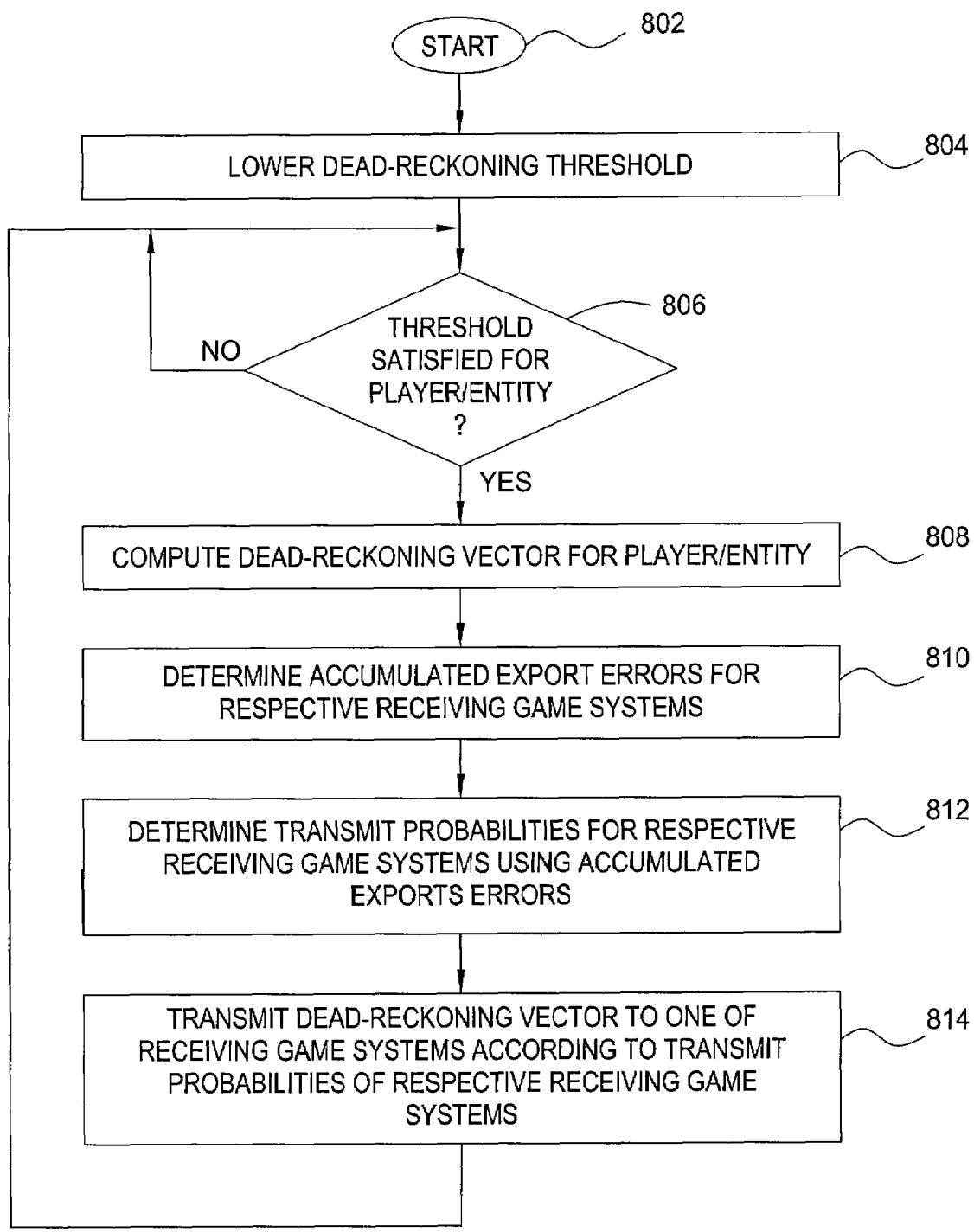
FIG. 8 depicts a method according to one embodiment of the present invention.

FIG. 8 depicts a method according to one embodiment of the present invention. In general, method 800 of FIG. 8 includes a method for equalizing a plurality of export errors associated with a respective plurality of receiving game systems for a dead-reckoning vector computed by a sending game system for a player/entity. In particular, method 800 of FIG. 8 includes a probabilistic budget-based dead-reckoning vector transmission method for attempting to equalize the respective export errors. Although depicted as being performed serially, those skilled in the art will appreciate that at least a portion of method 800 may be performed contemporaneously, or in a different order than presented in FIG. 8. The method 800 is entered at step 802 and proceeds to step 804.

At step 804, the dead-reckoning threshold is lowered, thereby resulting in computation, by the sending game system, of additional dead-reckoning vectors for each player/entity. At step 806, a determination is made as to whether the dead-reckoning threshold is satisfied for a player/entity. If the dead-reckoning threshold is not satisfied for the player/entity, method 800 remains at step 806 until the dead-reckoning threshold for the player/entity is satisfied. If the dead-reckoning threshold is satisfied for the player/entity, method 800 proceeds to step 808. At step 808, the dead-reckoning vector is computed for the player/entity. At step 810, accumulated export errors are determined for respective receiving game systems. In one embodiment, accumulated export errors may be determined using at least a portion of method 600 depicted and described with respect to FIG. 6.

At step 812, transmit probabilities are determined for receiving game systems using respective accumulated export errors. In one embodiment, transmit probabilities may be determined such that the accumulated export errors and associated transmit probabilities are proportional (i.e., the higher the accumulated export error for the receiving game system the higher the associated transmit probability for the receiving game system). At step 814, the dead-reckoning vector is transmitted to one of the receiving game systems according to the respective transmit probabilities. In one embodiment, the dead-reckoning vector is transmitted to the receiving game system having the highest associated transmit probability. From step 814, method 800 returns to step 806, at which point the sending game system monitors the player/entity for identifying satisfaction of the dead-reckoning threshold.

For method 800 of FIG. 8, lowering of the dead-reckoning threshold is equivalent to increasing the number of trigger points at which dead-reckoning vectors are generated. For example, suppose the dead-reckoning threshold of an embodiment utilizing the scheduling algorithm described herein with respect to FIG. 4-FIG. 7 is set such that the number of triggers (i.e., number of times the dead-reckoning threshold is satisfied) is t and at each trigger n dead-reckoning vectors are sent by the sending game system, thereby resulting in a total of nt dead-reckoning vectors. As described herein, method 800 of FIG. 8 operates to keep the total number of dead-reckoning vectors sent by the sending game system constant at nt, while lowering the number of dead-reckoning vectors sent at each trigger (i.e., at each trigger the computed dead-reckoning vector is sent to a subset of the receiving game systems).

Figure 9:
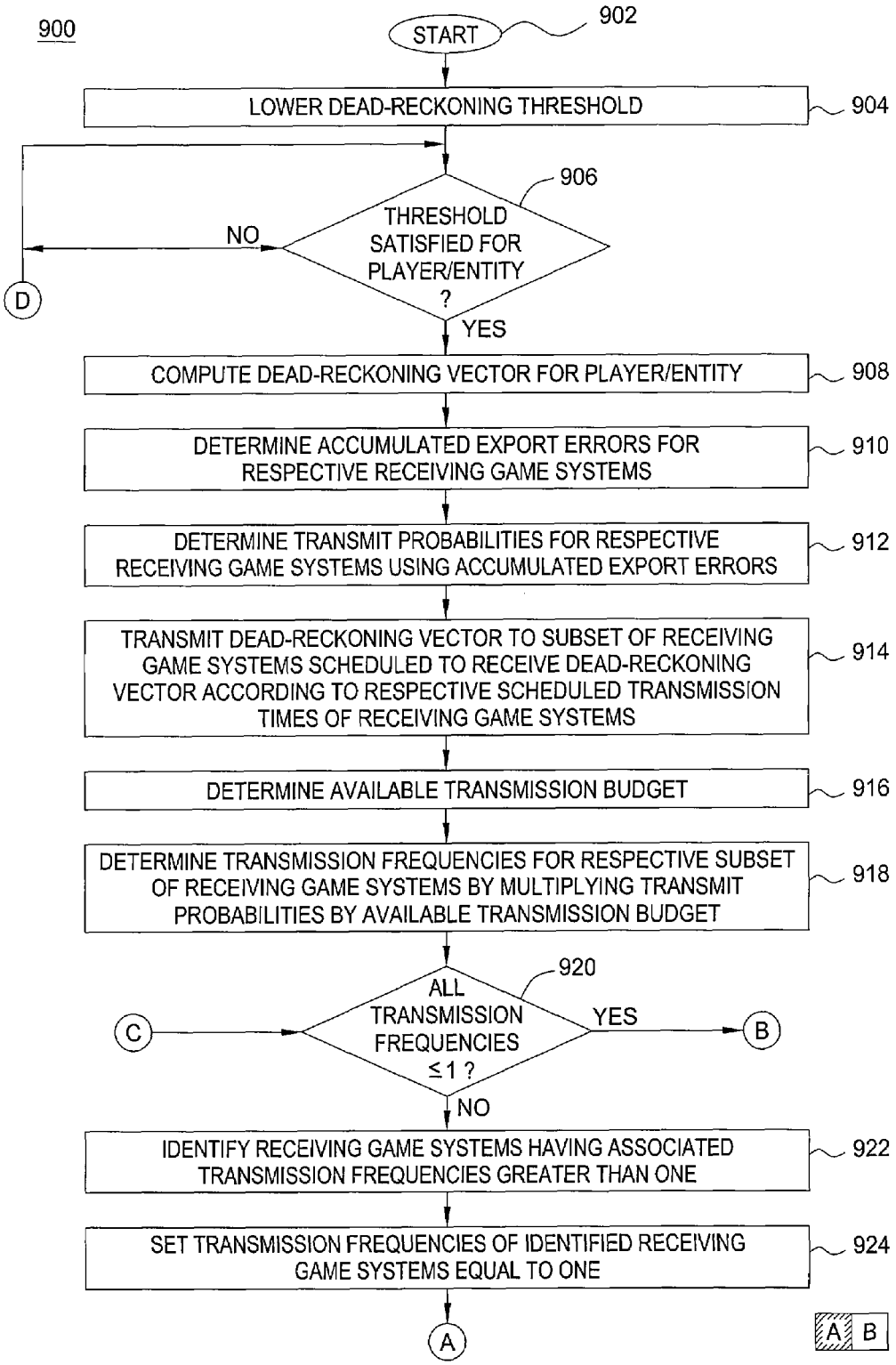
FIG. 9 depicts a method according to one embodiment of the present invention.

FIG. 9 depicts a method according to one embodiment of the present invention. In general, method 900 of FIG. 9 includes a method for equalizing a plurality of export errors associated with a respective plurality of receiving game systems for a dead-reckoning vector computed by a sending game system for a player/entity. In particular, method 900 of FIG. 9 includes a deterministic budget-based dead-reckoning vector transmission method for attempting to equalize the respective export errors. Although depicted as being performed serially, those skilled in the art will appreciate that at least a portion of method 900 may be performed contemporaneously, or in a different order than presented in FIG. 9. The method 900 is entered at step 902 and proceeds to step 904.

At step 904, the dead-reckoning threshold is lowered, thereby resulting in computation, by the sending game system, of additional dead-reckoning vectors for each player/entity. At step 906, a determination is made as to whether the dead-reckoning threshold is satisfied for a player/entity. If the dead-reckoning threshold is not satisfied for the player/entity, method 900 remains at step 906 until the dead-reckoning threshold for the player/entity is satisfied. If the dead-reckoning threshold is satisfied for the player/entity, method 900 proceeds to step 908. At step 908, the dead-reckoning vector is computed for the player/entity. At step 910, accumulated export errors are determined for respective receiving game systems. In one embodiment, accumulated export errors may be determined using at least a portion of method 600 depicted and described with respect to FIG. 6.

At step 912, transmit probabilities are determined for receiving game systems using respective accumulated export errors. In one embodiment, transmit probabilities may be determined such that the accumulated export errors and associated transmit probabilities are proportional (i.e., the higher the accumulated export error for the receiving game system the higher the associated transmit probability for the receiving game system). At step 914, the dead-reckoning vector is transmitted to a subset of receiving game systems scheduled, according to respective scheduled transmission times of receiving game systems, to receive the dead-reckoning vector. The scheduled transmission times by which transmission of the dead-reckoning vector is controlled are computed with respect to previous dead-reckoning vectors (depicted and described herein with respect to steps 916-936 of FIG.9).

At step 916, an available transmission budget is determined. At step 918, transmission frequencies are determined for the respective subset of receiving game systems by multiplying the transmit probabilities by the available transmission budget. At step 920, a determination is made as to whether all transmission frequencies for the respective subset of receiving game systems are less than or equal to one. If all transmission frequencies are less than or equal to one, method 900 proceeds to step 930. If all transmission frequencies are not less than or equal to one, method 900 proceeds to step 922. At step 922, receiving game systems having associated transmission frequencies greater than one are identified. At step 924, transmission frequencies of the identified receiving game systems are set equal to one.

At step 926, surplus transmission frequencies are determined for the respective identified receiving game systems. In one embodiment surplus transmission frequencies are determined as respective remainders resulting from setting of transmission frequencies of the identified receiving game systems equal to one. At step 928, transmission frequencies for the respective subset of receiving game systems are updated by distributing the surplus transmission frequencies across the subset of receiving game systems. From step 928, method 900 returns to step 920, at which point a determination is made as to whether all transmission frequencies for the respective subset of receiving game systems are less than or equal to one. In other words, steps 920-928 are repeated until all transmission frequencies of the subset of receiving game systems are less than or equal to one.

At step 930, scheduled transmission times are determined for the subset of receiving game systems using the respective updated transmission frequencies. In one embodiment, scheduled transmission times for the subset of receiving game systems may be determined as an inverse of the respective updated transmission frequencies. At step 932, the scheduled transmission times are further updated for the subset of receiving game systems using respective previous credit values associated with previous dead-reckoning vectors (depicted and described herein in step 936) with respect to the current dead-reckoning vector for use in updating scheduled transmission times for subsequent dead-reckoning vectors computed by the sending game system). In one embodiment, previous credit values may be subtracted from the respective scheduled transmission times.

At step 934, the scheduled transmission times are further updated using a ceiling function to eliminate fractional scheduled transmission times. At step 936, current credit values associated with the current dead-reckoning vector are determined. In one embodiment, current credit values adapted for use in determining scheduled transmission times for subsequent dead-reckoning vectors may be determined as respective differences between scheduled transmission times updated using the ceiling function and scheduled transmission times updated using previous credit values. From step 936, method 900 of FIG. 9 returns to step 906, at which point a determination is made as to whether the dead-reckoning threshold is satisfied for a player/entity (and method 900 remains at step 906 until the dead-reckoning threshold for the player/entity is satisfied).

In one example, assuming the updated scheduled transmission time associated with one of the receiving game systems indicates that a dead-reckoning vector should be sent to the receiving game system every 3.5 triggers (i.e., frequency is 1/3.5), since fractional triggers do not occur in practice, dead-reckoning vectors may be sent every 4 triggers, thereby resulting in a credit value of 0.5 for the current dead-reckoning vector for use in computing updated transmission times for subsequent dead-reckoning vectors sent to the receiving game system. In this example, assuming, for the next dead-reckoning vector, that the updated scheduled transmission time indicates that the dead-reckoning vector should be sent to the receiving game system every 3.5 triggers, the credit value of 0.5 may be used to reduce the updated scheduled transmission time from 3.5 triggers to 3 triggers (rather than 4 triggers after application of the ceiling function).

Figure 10:
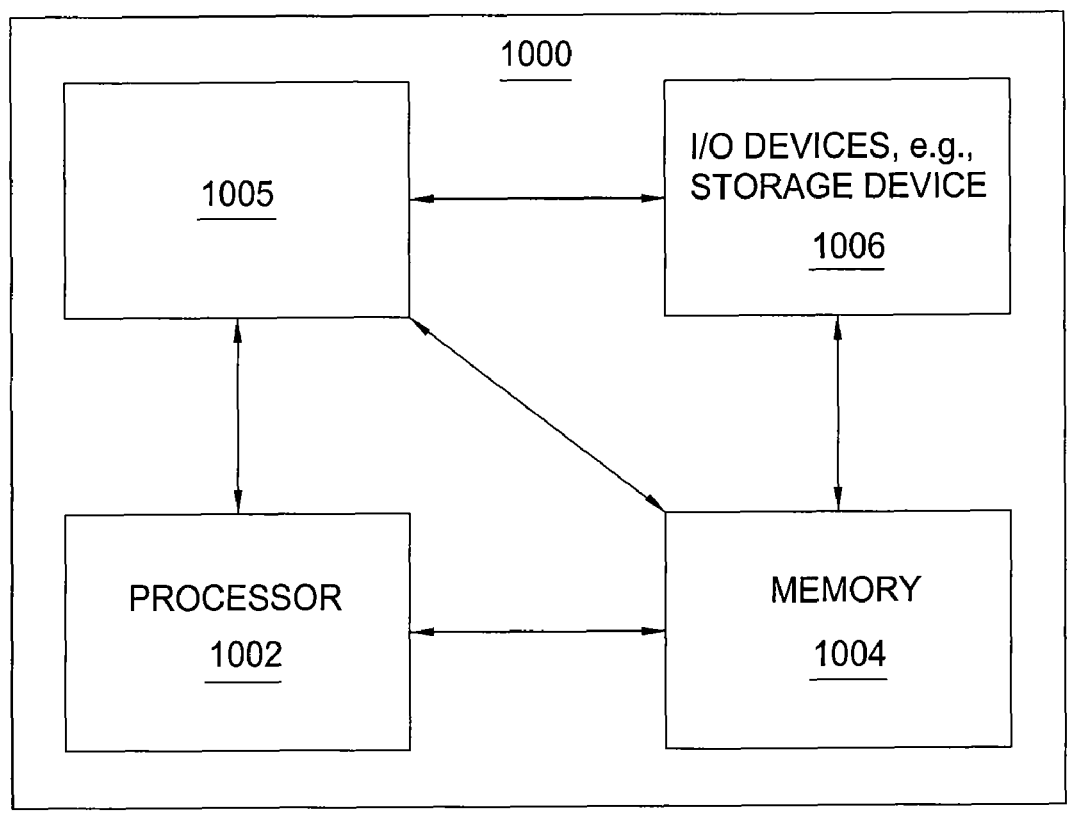
FIG. 10 depicts a high-level block diagram of a general-purpose computer suitable for use in performing the functions described herein.

FIG. 10 depicts a high-level block diagram of a general-purpose computer suitable for use in performing the functions described herein. As depicted in FIG. 10, system 1000 comprises a processor element 1002 (e.g., a CPU), a memory 1004, e.g., random access memory (RAM) and/or read only memory (ROM), a dead-reckoning vector control module 1005, and various input/output devices 1006 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present dead-reckoning vector control process 1005 can be loaded into memory 1004 and executed by processor 1002 to implement the functions as discussed above. As such, dead-reckoning vector control process 1005 (including associated data structures) of the present invention can be stored on a computer readable medium or carrier, e.g., RAM memory, magnetic or optical drive or diskette and the like.

The present invention is depicted and described herein with respect to a generic network, indicating that the present invention may be implemented using various network types, network element, network functions, protocols, and the like, as well as various combinations thereof. Although primarily depicted and described herein with respect to a specific network configuration, the present invention may be implemented using various other network configurations. Although primarily depicted and described herein with respect to specific dead-reckoning vectors (e.g., specific information, formats, and the like), the present invention may be implemented using various other dead-reckoning vector information, formats, and the like, as well as various combinations thereof.

Although various embodiments which incorporate the teachings of the present invention have been shown and described in detail herein, those skilled in the art can readily devise many other varied embodiments that still incorporate these teachings.

What is claimed is:

1. A method, comprising:
generating, at a sending system, a plurality of current messages adapted for rendering an asset within an application space of a respective plurality of receiving systems;
determining, for each of the receiving systems, a respective accumulated export error comprising a sum of an estimated current message export error associated with the current message generated for the receiving system and an accumulated previous message export error associated with at least one previous message propagated from the sending system toward the receiving system; and
transmitting the current messages toward the respective receiving systems in a manner tending to equalize the accumulated export errors associated with the receiving systems.

2. The method of claim 1, wherein the current messages are generated in response to a trigger condition, wherein the trigger condition comprises at least one of a threshold being satisfied and a periodic trigger condition.

3. The method of claim 1, wherein transmitting the current messages comprises:
computing, using the accumulated export errors, a plurality of scheduling times associated with the respective receiving systems; and
transmitting the current messages toward the receiving systems according to the respective scheduling times.

4. The method of claim 3, wherein computing the scheduling times comprises:
computing, using the accumulated export errors, a plurality of scheduling instants associated with the respective receiving systems;
normalizing the scheduling instants in a manner adapted to minimize the scheduling instants; and
determining the scheduling times using the normalized scheduling instants.

5. The method of claim 1, wherein, for each of the receiving systems, determining the accumulated export error comprises:
computing the estimated current message export error for the receiving system;
computing the accumulated previous message export error for the receiving system; and
computing the accumulated export error by summing the estimated current message export error and the accumulated previous message export error.

6. The method of claim 5, wherein computing the estimated current message export error comprises:
determining an estimated propagation delay from the sending system to the receiving system; and
computing the estimated current message export error using the estimated propagation delay.

7. The method of claim 5, wherein computing the accumulated previous message export error comprises:
for each of at least one previous message generated by the sending system for the receiving system, determining an estimated export error associated with previous message, the estimated export error associated with the previous message comprising an estimated propagation delay from the sending system to the receiving system;
for each of the at least one previous message, determining an actual export error associated with the previous message, the actual export error comprising an actual propagation delay from the sending system to the receiving system;
for each of the at least one previous message, computing a relative export error as a difference between the estimated export error and the actual export error; and
computing the accumulated previous message export error as a sum of the at least one relative export error.

8. The method of claim 7, wherein determining the actual propagation delay associated with the previous message comprises:
receiving a feedback message from the receiving system in response to the previous message, wherein the feedback message comprises a time at which the previous message was received by the receiving system; and
computing the actual propagation delay as a difference between the time at which the previous message was received by the receiving system and a time at which the previous message was transmitted by the sending system.

9. The method of claim 1, further comprising:
generating, at the sending system, a plurality of next messages adapted for placing the asset on the respective receiving systems; and
in response to a determination that the next messages are generated before each of the current messages are transmitted toward the respective receiving systems, flushing from the sending system ones of the current messages which have not been transmitted toward the receiving systems.

10. The method of claim 1, wherein transmitting the current messages comprises:
determining a transmission probability for each receiving system using the accumulated export error associated with the receiving system; and
transmitting the current messages toward the respective receiving systems using the respective transmission probabilities.

11. An apparatus, comprising:
a processor configured to:
generate, at a sending system, a plurality of current messages adapted for rendering an asset within an application space of a respective plurality of receiving systems;
determine, for each of the receiving systems, a respective accumulated export error comprising a sum of an estimated current message export error associated with the current message generated for the receiving system and an accumulated previous message export error associated with at least one previous message propagated from the sending system toward the receiving system; and
transmit the current messages toward the respective receiving systems in a manner tending to equalize the accumulated export errors associated with the receiving systems.

12. The apparatus of claim 11, wherein the processor is configured to transmit the current messages by:
   computing, using the accumulated export errors, a plurality of scheduling times associated with the respective receiving systems; and
   transmitting the current messages toward the receiving systems according to the respective scheduling times.

13. The apparatus of claim 12, wherein the processor is configured to compute the scheduling times by:
   computing, using the accumulated export errors, a plurality of scheduling instants associated with the respective receiving systems;
   normalizing the scheduling instants in a manner adapted to minimize the scheduling instants; and
   determining the scheduling times using the normalized scheduling instants.

14. The apparatus of claim 11, wherein, for each of the receiving systems, the processor is configured to determine the accumulated export error by:
   computing the estimated current message export error for the receiving system;
   computing the accumulated previous message export error for the receiving system; and
   computing the accumulated export error by summing the estimated current message export error and the accumulated previous message export error.

15. The apparatus of claim 14, wherein computing the estimated current message export error comprises:
   determining an estimated propagation delay from the sending system to the receiving system; and
   computing the estimated current message export error using the estimated propagation delay.

16. The apparatus of claim 14, wherein computing the accumulated previous message export error comprises:
   determining, for each of at least one previous message generated by the sending system for the receiving system, an estimated export error associated with previous message, the estimated export error associated with the previous message comprising an estimated propagation delay from the sending system to the receiving system;
   determining, for each of the at least one previous message, an actual export error associated with the previous message, the actual export error comprising an actual propagation delay from the sending system to the receiving system;
   computing, for each of the at least one previous message, a relative export error as a difference between the estimated export error and the actual export error; and
   computing the accumulated previous message export error as a sum of the at least one relative export error.

17. The apparatus of claim 16, wherein determining the actual propagation delay associated with the previous message comprises:
   receiving a feedback message from the receiving system in response to the previous message, wherein the feedback message comprises a time at which the previous message was received by the receiving system; and
   computing the actual propagation delay as a difference between the time at which the previous message was received by the receiving system and a time at which the previous message was transmitted by the sending system.

18. The apparatus of claim 11, wherein the processor is configured to:
   generate, at the sending system, a plurality of next messages adapted for placing the asset on the respective receiving systems; and
   in response to a determination that the next messages are generated before each of the current messages are transmitted toward the respective receiving systems, flush, from the sending system, ones of the current messages which have not been transmitted toward the receiving systems.

19. The apparatus of claim 11, wherein the processor is configured to transmit the current messages by:
   determining a transmission probability for each receiving system using the accumulated export error associated with the receiving system; and
   transmitting the current messages toward the respective receiving systems using the respective transmission probabilities.

20. A non-transitory computer readable storage medium storing a software program, that, when executed by a computer, causes the computer to perform a method comprising:
   generating, at a sending system, a plurality of current messages adapted for rendering an asset within an application space of a respective plurality of receiving systems;
   determining, for each of the receiving systems, a respective accumulated export error comprising an estimated current message export error associated with the current message generated for the receiving system and an accumulated previous message export error associated with at least one previous message propagated from the sending system toward the receiving system; and
   transmitting the current messages toward the respective receiving systems in a manner tending to equalize the accumulated export errors associated with the receiving systems.

* * * * *